(12) United States Patent
Line et al.

(10) Patent No.: US 10,011,204 B2
(45) Date of Patent: Jul. 3, 2018

(54) MOLDED SOFT BACK PANEL

(71) Applicant: FORD GLOBAL TECHNOLOGIES, LLC, Dearborn, MI (US)

(72) Inventors: Johnathan Andrew Line, Northville, MI (US); Marcos Silva Kondrad, Macomb Township, MI (US); Alan George Dry, Grosse Pointe Woods, MI (US); David Frederick Lyons, New Haven, MI (US); Kevin Wayne Preuss, Berkley, MI (US); Daniel Ferretti, Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/341,388

(22) Filed: Nov. 2, 2016

(65) Prior Publication Data
US 2018/0037146 A1    Feb. 8, 2018

Related U.S. Application Data

(63) Continuation-in-part of application No. 15/229,256, filed on Aug. 5, 2016.

(51) Int. Cl.
| | |
|---|---|
| *B60N 2/68* | (2006.01) |
| *B60N 2/48* | (2006.01) |
| *B60N 2/58* | (2006.01) |
| *B60N 2/80* | (2018.01) |

(52) U.S. Cl.
CPC ............ *B60N 2/68* (2013.01); *B60N 2/48* (2013.01); *B60N 2/58* (2013.01); *B60N 2/80* (2018.02)

(58) Field of Classification Search
CPC ... B60N 2/80; B60N 2/58; B60N 2/48; B60N 2/68
USPC ............ 297/452.13, 452.14, 452.15, 452.18, 297/452.58, 452.59, 452.65, 440.2
See application file for complete search history.

(56) References Cited

U.S. PATENT DOCUMENTS

| | | | |
|---|---|---|---|
| 4,746,168 A * | 5/1988 | Bracesco | B60N 2/66 297/440.2 X |
| 4,805,962 A * | 2/1989 | Sacco | B60N 2/242 297/452.14 X |
| 5,236,247 A | 8/1993 | Hewko | |
| 5,826,946 A | 10/1998 | Matthews et al. | |
| 5,879,055 A | 3/1999 | Dishner et al. | |
| 5,882,073 A | 3/1999 | Burchi et al. | |

(Continued)

*Primary Examiner* — Rodney B White
(74) *Attorney, Agent, or Firm* — Vichit Chea; Price Heneveld LLP

(57) ABSTRACT

A motor vehicle seating assembly for a motor vehicle having a lower seat assembly and an upwardly extending seat back assembly is disclosed. The upwardly extending seat back assembly comprises a seat back frame and a head rest hood module attached to an upper portion of the seat back frame, the head rest hood module comprising a mount disposed proximate a lower rear edge of the head rest hood module. A decorative seat back rear panel module comprising a first seat back rear perimeter panel and a second seat back rear central panel is operably coupled with the first seat back rear perimeter panel to define a rear exterior surface area of the decorative seat back rear panel module, wherein an upper laterally transverse member of the first seat back rear perimeter panel is attached to the mount disposed on the head rest hood module.

16 Claims, 23 Drawing Sheets

(56) References Cited

U.S. PATENT DOCUMENTS

| | | | | |
|---|---|---|---|---|
| 5,918,943 A * | 7/1999 | Mitschelen | | B60N 2/68 |
| | | | | 297/452.18 X |
| 5,988,757 A * | 11/1999 | Vishey | | B60N 2/23 |
| | | | | 297/452.18 |
| 6,070,942 A * | 6/2000 | Barton | | A47C 4/54 |
| | | | | 297/452.65 X |
| 6,152,534 A * | 11/2000 | Maeda | | B60N 2/5825 |
| | | | | 297/452.59 X |
| 6,199,948 B1 | 3/2001 | Bush et al. | | |
| 6,302,487 B1 * | 10/2001 | Fujita | | B60N 2/5825 |
| | | | | 297/452.56 |
| 6,485,103 B1 * | 11/2002 | Yamada | | A47C 23/26 |
| | | | | 297/452.56 X |
| 6,994,401 B1 | 2/2006 | Fischer et al. | | |
| 7,077,478 B2 * | 7/2006 | Nakamura | | B60N 2/68 |
| | | | | 297/440.2 X |
| 7,108,327 B2 | 9/2006 | Locke et al. | | |
| 7,222,915 B2 | 5/2007 | Philippot | | |
| 7,401,852 B2 | 7/2008 | Humer et al. | | |
| 7,410,219 B2 | 8/2008 | Kraft et al. | | |
| 7,731,294 B2 * | 6/2010 | Yasuda | | B60N 2/58 |
| | | | | 297/452.13 |
| 7,850,246 B2 * | 12/2010 | Kolich | | B60N 2/70 |
| | | | | 297/452.14 X |
| 7,850,247 B2 | 12/2010 | Stauske et al. | | |
| 7,905,551 B2 | 3/2011 | Sung et al. | | |
| 8,297,708 B2 * | 10/2012 | Mizobata | | B60N 2/7011 |
| | | | | 297/452.13 X |
| 8,474,913 B2 | 7/2013 | Line et al. | | |
| 8,474,917 B2 | 7/2013 | Line et al. | | |
| 8,540,318 B2 | 9/2013 | Folkert et al. | | |
| 8,590,978 B2 * | 11/2013 | Jaranson | | B60N 2/643 |
| | | | | 297/452.14 X |
| 8,708,418 B2 * | 4/2014 | Mizobata | | B60N 2/5825 |
| | | | | 297/440.2 X |
| 8,727,374 B1 | 5/2014 | Line et al. | | |
| 8,733,834 B2 | 5/2014 | Palmer | | |
| 8,801,094 B2 * | 8/2014 | Nishiura | | B60N 2/7011 |
| | | | | 297/452.56 X |
| 8,857,908 B2 * | 10/2014 | Brncick | | B60N 2/0232 |
| | | | | 297/452.15 X |
| 8,894,154 B2 * | 11/2014 | Kulkarni | | B60N 2/682 |
| | | | | 297/452.14 X |
| 8,985,685 B2 * | 3/2015 | Line | | B60R 7/043 |
| | | | | 297/452.14 X |
| 9,022,475 B2 * | 5/2015 | Brncick | | B60N 2/643 |
| | | | | 297/284.2 |
| 9,096,147 B2 * | 8/2015 | Kulkarni | | B60N 2/028 |
| 9,409,504 B2 | 8/2016 | Line et al. | | |
| 9,669,744 B2 * | 6/2017 | Cao | | B60N 2/4802 |
| 2002/0033630 A1 * | 3/2002 | Takata | | B60N 2/46 |
| | | | | 297/452.56 |
| 2002/0041121 A1 * | 4/2002 | Takata | | B60N 2/3011 |
| | | | | 297/378.1 |
| 2002/0096932 A1 * | 7/2002 | Fujita | | B60N 2/58 |
| | | | | 297/452.56 |
| 2004/0183356 A1 * | 9/2004 | Philippot | | B60N 2/70 |
| | | | | 297/452.18 |
| 2005/0248189 A1 | 11/2005 | Prasatek et al. | | |
| 2008/0136240 A1 * | 6/2008 | Matthews | | B60N 2/4235 |
| | | | | 297/452.18 X |
| 2008/0252111 A1 | 10/2008 | Rothkop et al. | | |
| 2008/0277987 A1 * | 11/2008 | Deadrick | | B60N 2/686 |
| | | | | 297/352 |
| 2010/0117411 A1 * | 5/2010 | Fujita | | A61B 5/0205 |
| | | | | 297/217.1 |
| 2011/0101744 A1 * | 5/2011 | Naughton | | B29C 44/1238 |
| | | | | 297/216.1 |
| 2012/0161481 A1 * | 6/2012 | Tache | | A47C 7/72 |
| | | | | 297/217.3 |
| 2012/0313409 A1 * | 12/2012 | Michalak | | B60N 2/56 |
| | | | | 297/452.48 X |
| 2013/0009442 A1 * | 1/2013 | Burnham | | B60N 2/68 |
| | | | | 297/452.18 |
| 2013/0082504 A1 * | 4/2013 | Archambault | | B60N 2/68 |
| | | | | 297/452.18 |
| 2013/0127215 A1 * | 5/2013 | Dumont | | B60N 2/4876 |
| | | | | 297/217.3 |
| 2013/0257120 A1 * | 10/2013 | Tracht | | B60R 21/207 |
| | | | | 297/216.13 |
| 2014/0203603 A1 * | 7/2014 | Line | | B60N 2/64 |
| | | | | 297/452.29 X |
| 2015/0008716 A1 * | 1/2015 | Dry | | B60N 2/44 |
| | | | | 297/452.18 |
| 2015/0145303 A1 * | 5/2015 | Line | | B60N 2/643 |
| | | | | 297/452.18 X |
| 2015/0165948 A1 * | 6/2015 | Kish | | B60N 2/68 |
| | | | | 297/452.18 X |
| 2015/0321614 A1 * | 11/2015 | Line | | B60R 7/005 |
| | | | | 297/188.04 |
| 2015/0343929 A1 * | 12/2015 | Yasuda | | B60N 2/646 |
| | | | | 297/452.18 |
| 2017/0368960 A1 * | 12/2017 | Whitmore | | B60N 2/02 |

* cited by examiner

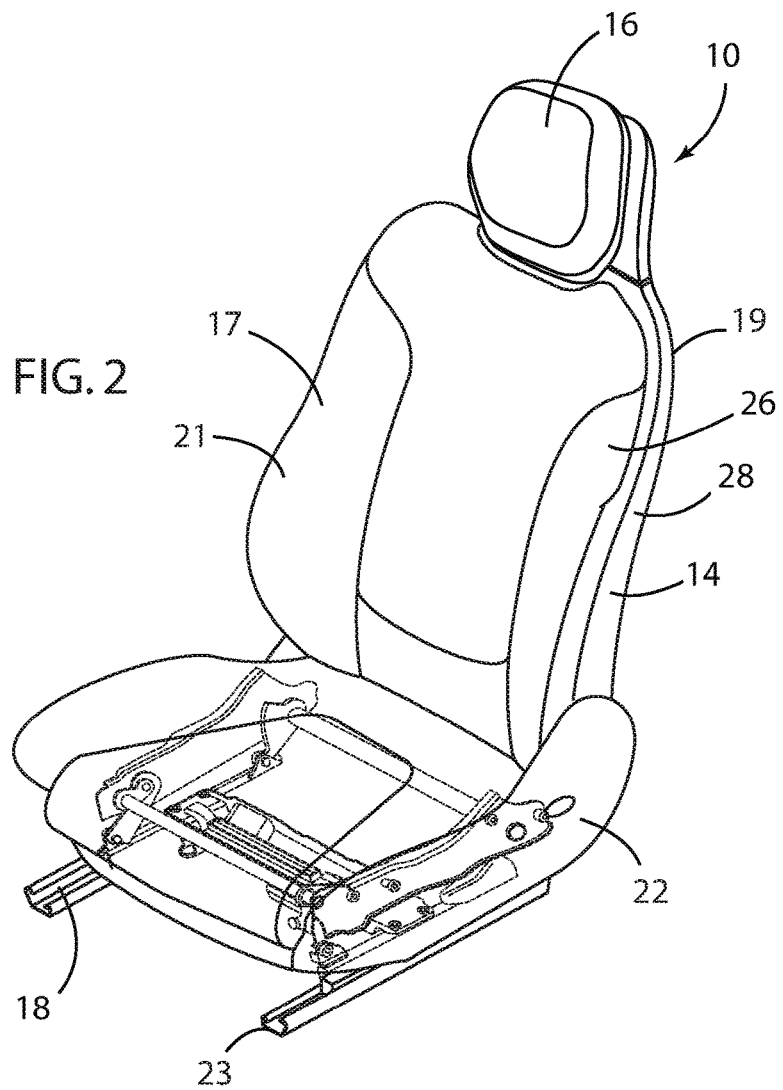

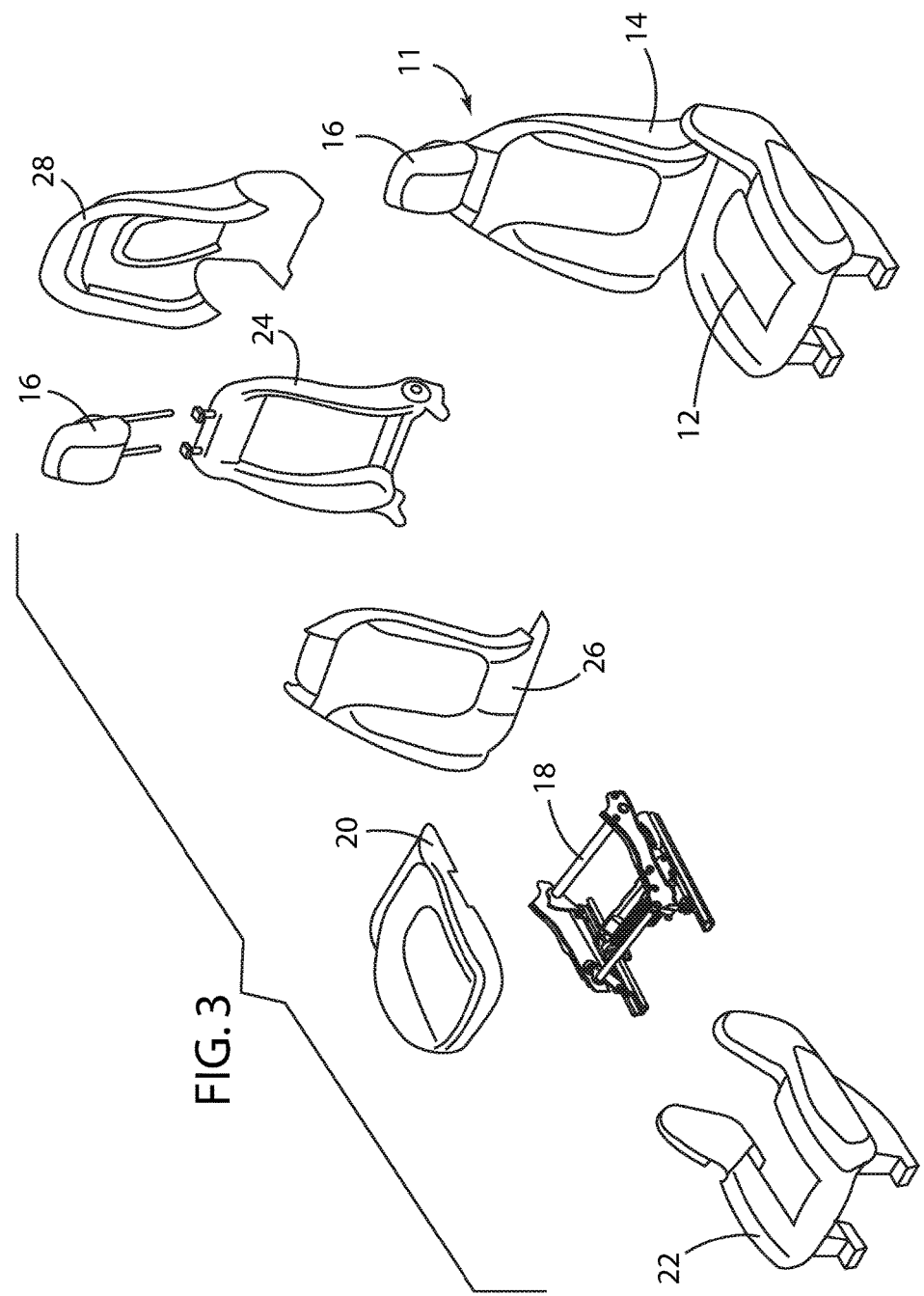

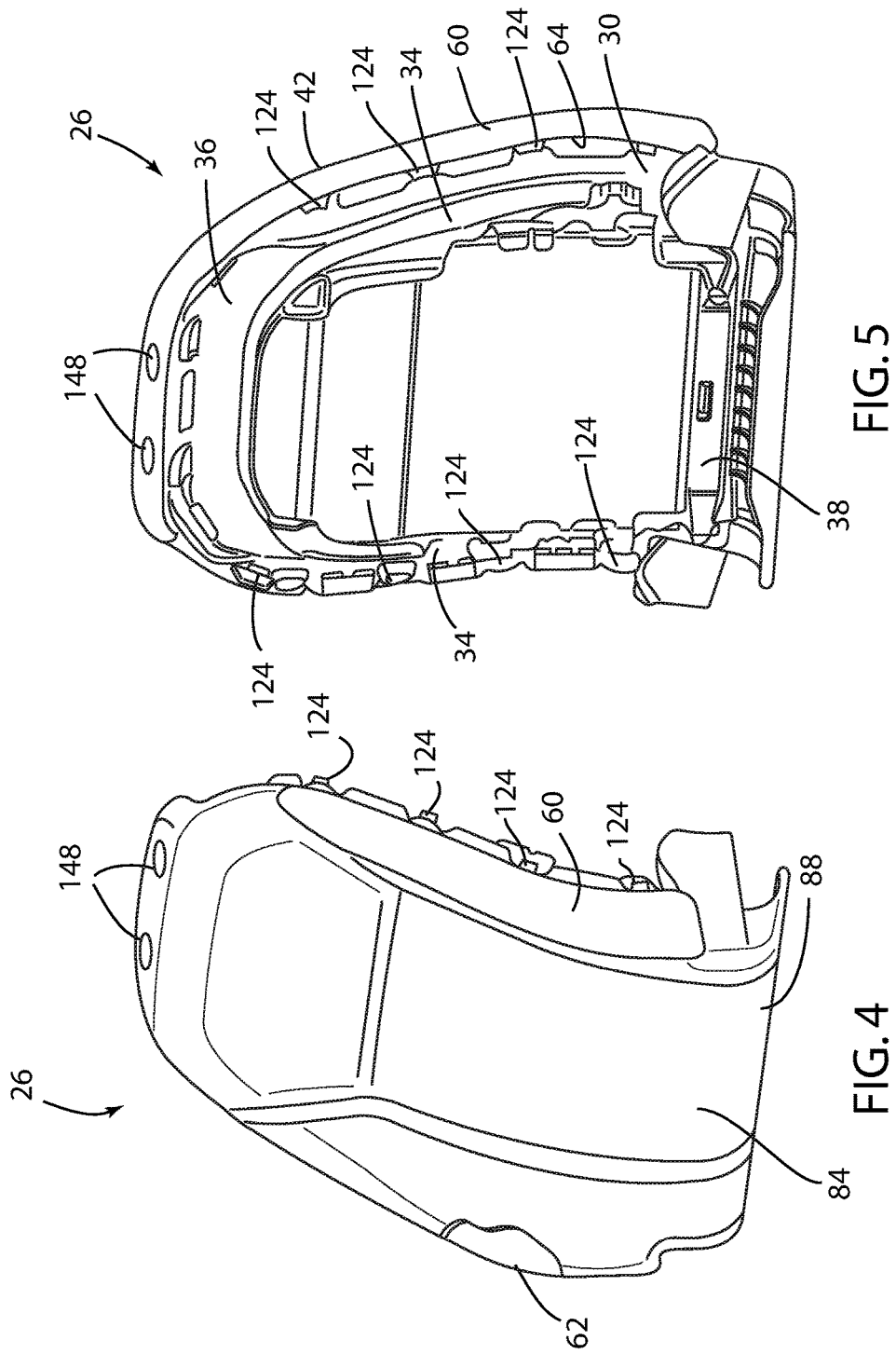

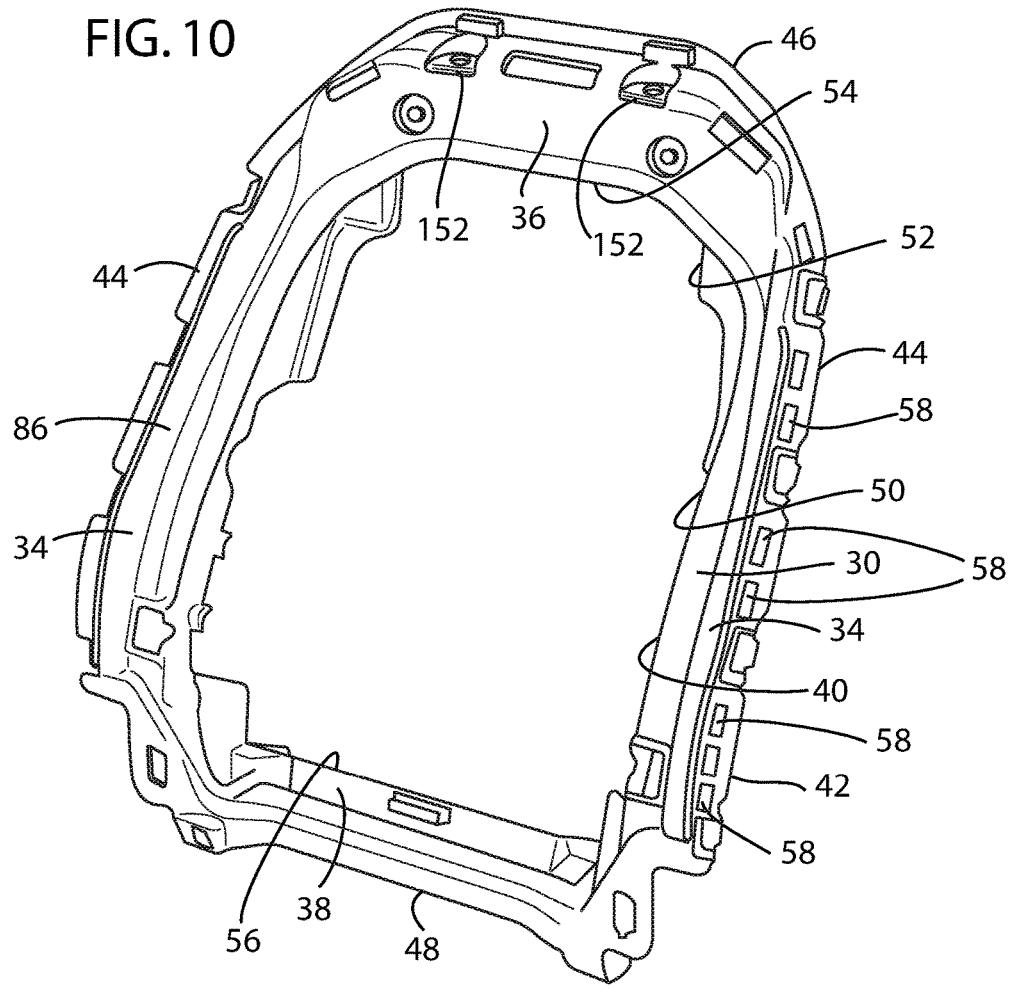

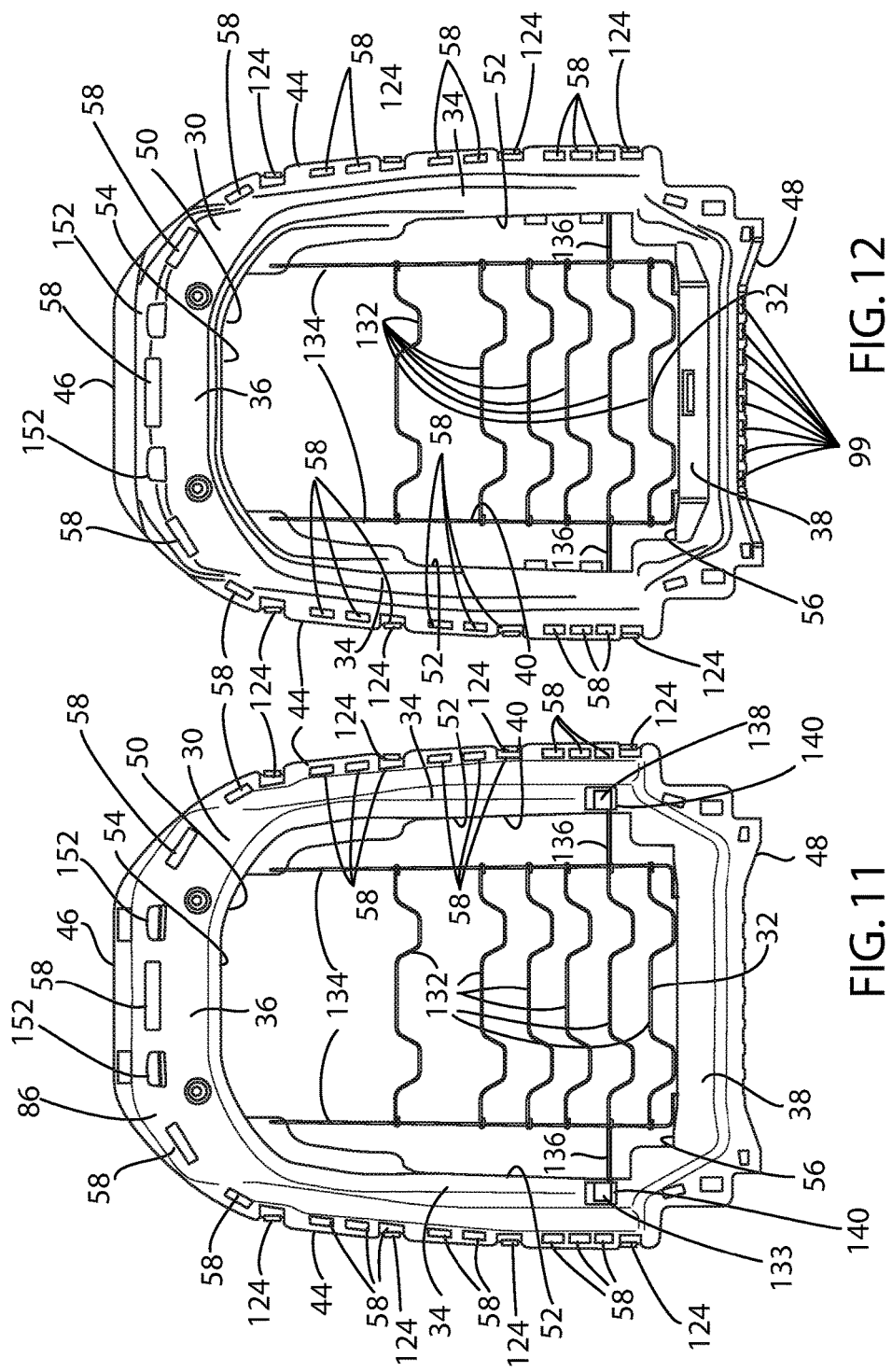

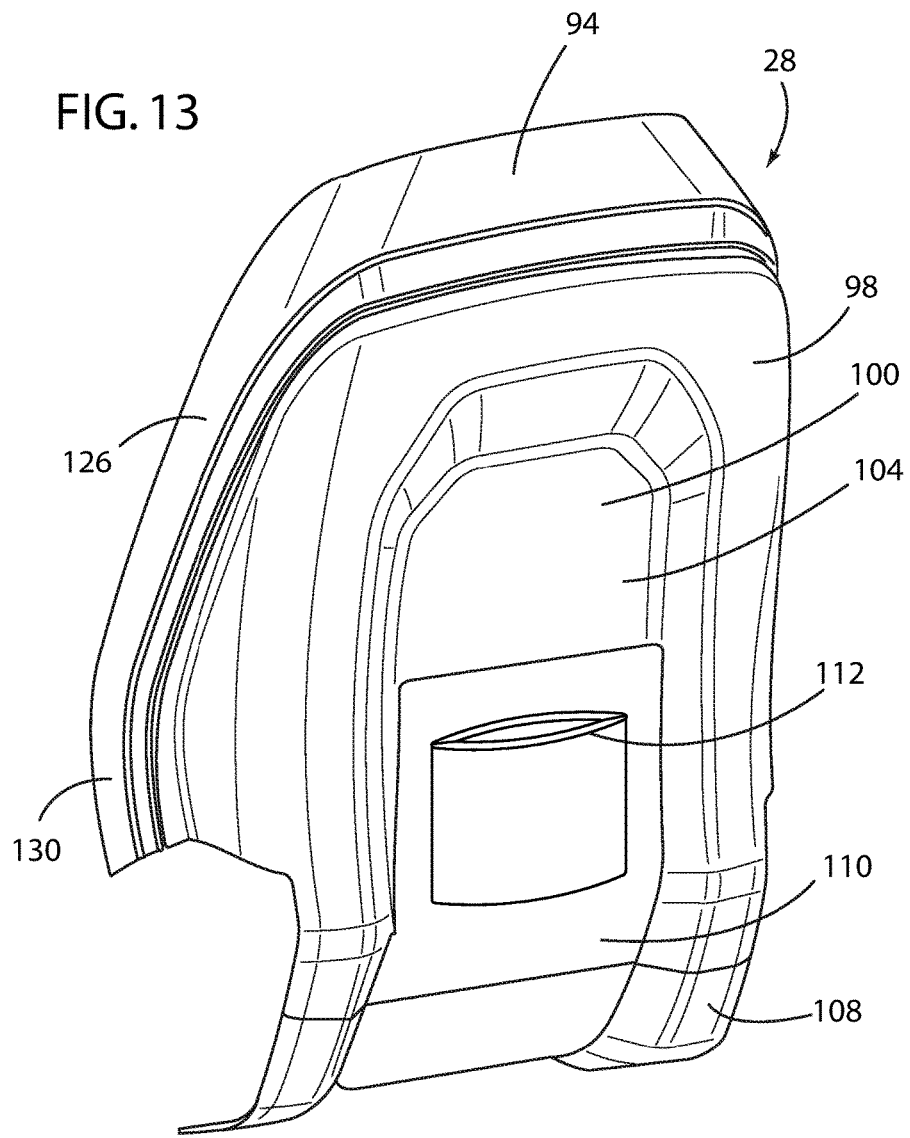

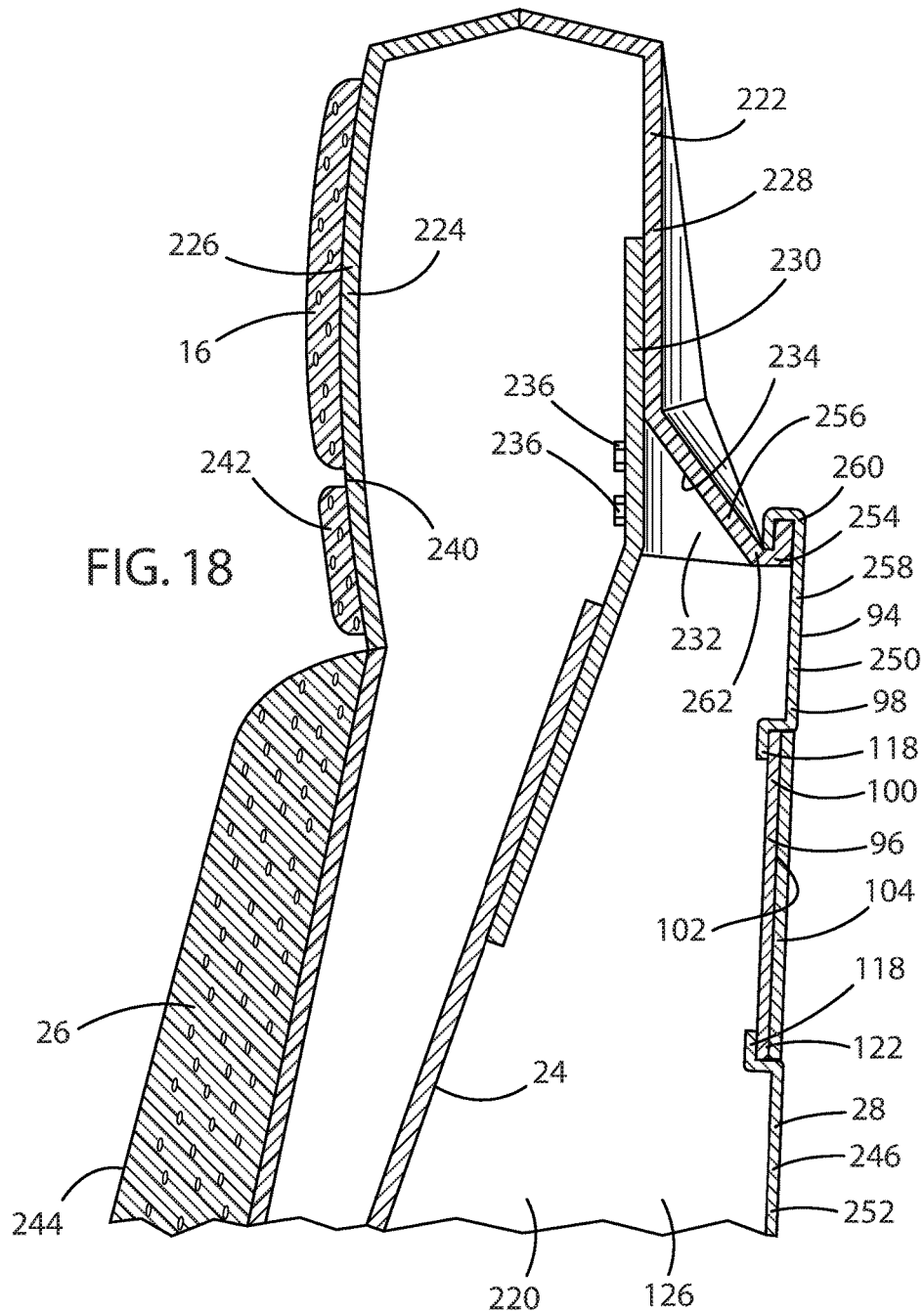

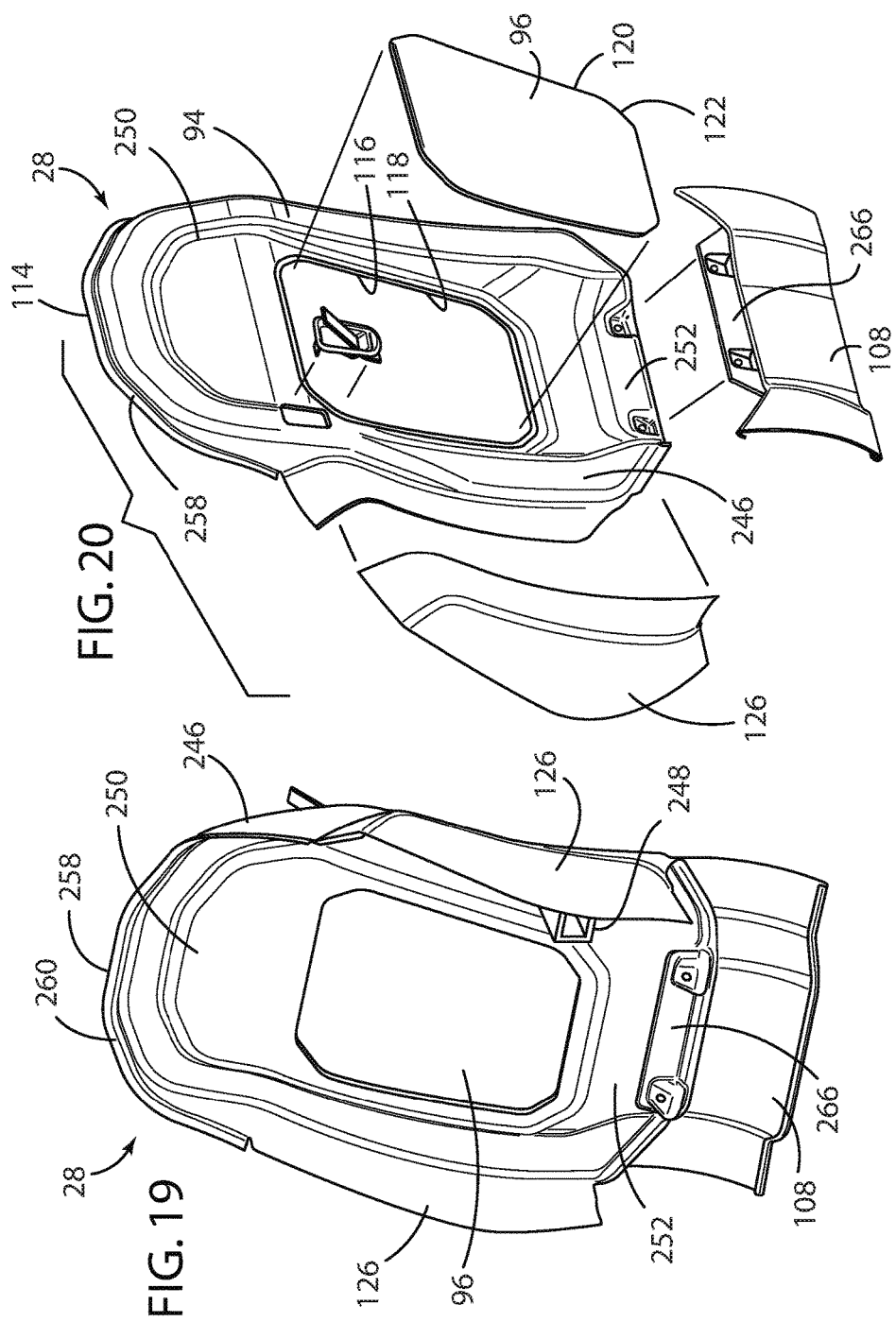

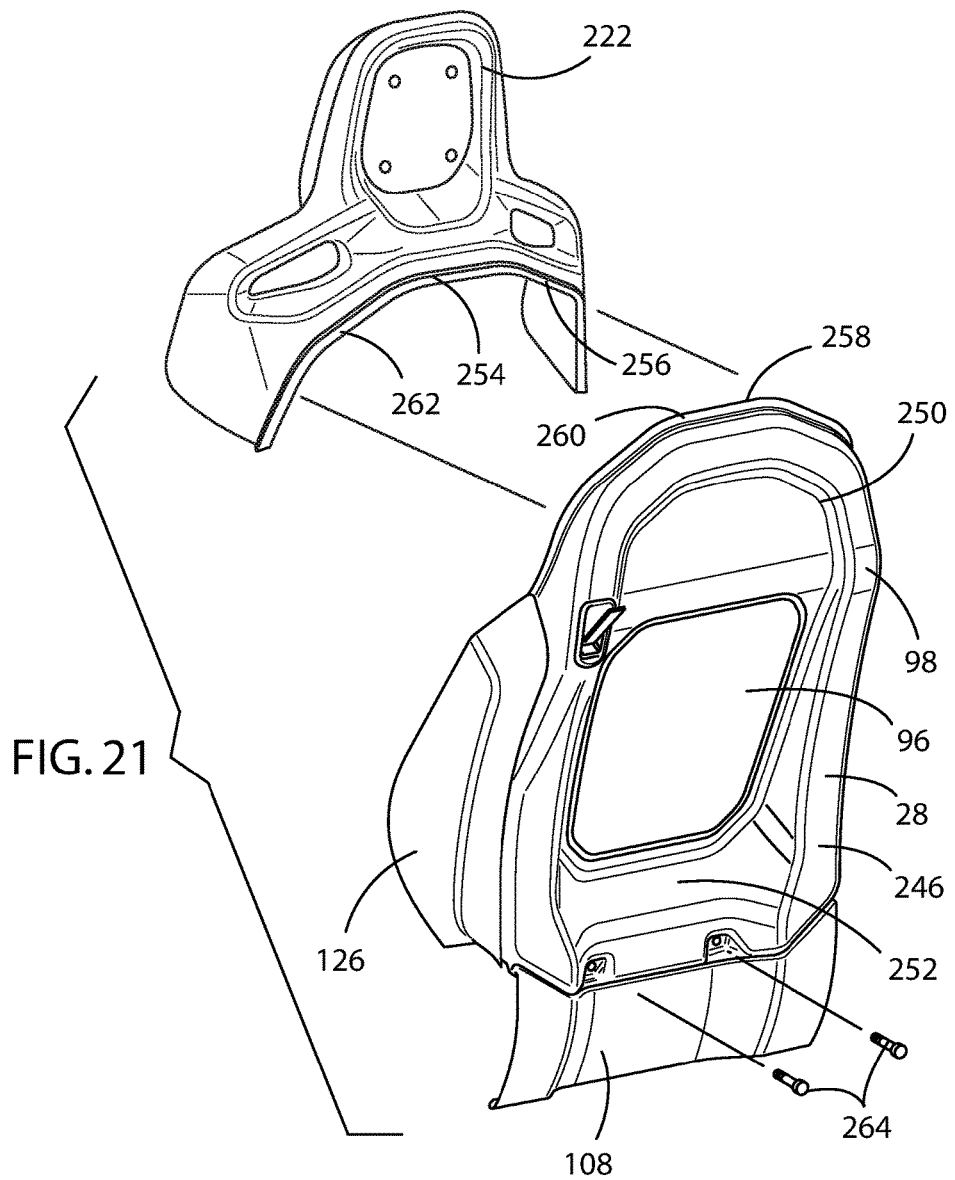

MOLDED SOFT BACK PANEL

CROSS-REFERENCE TO RELATED APPLICATIONS AND CLAIM TO PRIORITY

This application is a continuation-in-part of and claims priority under 35 U.S.C. § 120 to commonly owned, related U.S. patent application Ser. No. 15/229,256, filed Aug. 5, 2016, now U.S. Pat. No. 9,845,032, issued Dec. 19, 2017, entitled MODULAR BACK PANEL SUB-ASSEMBLY, the entire disclosure of which is incorporated herein by reference.

FIELD OF THE INVENTION

The present disclosure generally relates to a seat back rear panel for an upwardly extending seat back of a seating assembly for a motion vehicle and, more particularly, a decorative seat back rear panel module constructed from multiple panel interchangeable components.

BACKGROUND OF THE INVENTION

Modern motor vehicle seating assemblies are becoming more and more comfortable as designers improve their understanding of human ergonomics, posture, and comfortability. Vehicle seating assemblies that include comfort components in the motor vehicle seating assembly that can provide the driver and passengers with improved comfort and increased endurance for extensive vehicle rides. Additionally, various sizes and shapes of drivers and passengers can prove challenging when providing motor vehicle seating assemblies. Accordingly, aesthetically attractive motor vehicle seating assemblies that include components optimized to accommodate the different sizes and shapes of drivers and passengers, as well as the desired posture and sitting positions of those drivers and passengers, has become increasingly important.

As a consequence, contemporary motor vehicle seating assemblies now incorporate hundreds of discrete parts. The assembly of such contemporary motor vehicle seating assemblies requires bringing together these hundreds of parts to be assembled into a final motor vehicle seating assembly, typically employing so-called "Kanban" or "Just-In-Time" ("JIT") assembly processes to achieve the completed motor vehicle seat assembly. Using such assembly processes, it has been found to be advantageous to modularize the motor vehicle seating assembly into discrete subassemblies in order to reduce the costs of final assembly. This allows the subassemblies to be sourced from a location independent of the final JIT assembly plant. An improved motor vehicle seating assembly module design to achieve all of the needs of the motor vehicle seating assembly, particularly a decorative seat back rear panel module to provide these assembly advantages, as well as achieving a new and flexible look and styling, was desired.

SUMMARY OF THE INVENTION

According to one aspect of the present disclosure, a motor vehicle seating assembly for a motor vehicle having a lower seat assembly and an upwardly extending seat back assembly is disclosed. The upwardly extending seat back assembly comprises a seat back frame and a head rest hood module attached to an upper portion of the seat back frame, the head rest hood module comprising a mount disposed proximate a lower rear edge of the head rest hood module. A decorative seat back rear panel module comprising a first seat back rear perimeter panel and a second seat back rear central panel is operably coupled with the first seat back rear perimeter panel to define a rear exterior surface area of the decorative seat back rear panel module, wherein an upper laterally transverse member of the first seat back rear perimeter panel is attached to the mount disposed on the head rest hood module.

According to another aspect of the present disclosure, a seat back assembly comprises a head rest module and a seat back rear panel module having a first seat back rear perimeter panel and a second seat back rear central panel that define a rear exterior surface area of the seat back rear panel module, wherein an upper portion of the first seat back rear perimeter panel is attached to a lower edge of a rear portion of the head rest module.

According to yet another aspect of the present disclosure, a motor vehicle seating assembly comprises a lower seat assembly and an upwardly extending seat back assembly. The upwardly extending seat back assembly includes a seat back frame and a head rest hood module attached to an upper portion of the seat back frame, wherein the head rest hood module comprises a front shell portion, a rear shell portion, and a mount disposed proximate a lower rear edge of the rear shell portion of the head rest hood module. A decorative seat back rear panel module comprising a first seat back rear perimeter panel and a second seat back rear central panel that define a rear exterior surface of the decorative seat back rear panel module is provided. The second seat back rear central panel comprises a molded substrate having an outer surface and a trim covering disposed against the outer surface of the molded substrate. An upper laterally transverse member of the first seat back rear perimeter panel includes a forward facing molded-in flange along an upper edge of the upper laterally transverse member of the first seat back rear perimeter panel by which the upper laterally transverse member of the first seat back rear perimeter panel is attached to the mount disposed proximate the lower rear edge of the head rest hood module.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 2 is a front perspective view of the motor vehicle seating assembly of FIG. 1 according to the present disclosure;

FIG. 3 is an exploded front side perspective view of the motor vehicle seating assembly of FIG. 1 according to the present disclosure;

FIG. 4 is a front perspective view of the seat back and suspension module of the motor vehicle seating assembly of FIG. 1 according to the present disclosure;

FIG. 5 is a rear perspective view of the seat back and suspension module of the motor vehicle seating assembly of FIG. 1 according to the present disclosure;

FIG. 10 is a front perspective view of the one-piece composite inner carrier substrate of the seat back and suspension module of the motor vehicle seating assembly of FIG. 1 according to the present disclosure;

FIG. 11 is a front view of the one-piece composite inner carrier substrate of the seat back and suspension module of the motor vehicle seating assembly of FIG. 1 according to the present disclosure;

FIG. 12 is a rear view of the one-piece composite inner carrier substrate of the seat back and suspension module of the motor vehicle seating assembly of FIG. 1 according to the present disclosure;

FIG. 13 is a rear perspective view of the decorative seat back rear panel module of the motor vehicle seating assembly of FIG. 1 according to the present disclosure;

FIG. 18 is a side cross-sectional view of the head rest hood module and upper portion of the seat back of the second embodiment of a motor vehicle seating assembly of FIG. 15 according to the present disclosure;

FIG. 19 is front side perspective view of the decorative seat back rear panel module of the second embodiment of a motor vehicle seating assembly of FIG. 15 according to the present disclosure;

FIG. 20 is rear exploded perspective view of the decorative seat back rear panel module of the second embodiment of a motor vehicle seating assembly of FIG. 15 according to the present disclosure;

FIG. 21 is rear perspective view of the decorative seat back rear panel module and head rest hood module of the second embodiment of a motor vehicle seating assembly of FIG. 15 according to the present disclosure;

DETAILED DESCRIPTION OF THE EMBODIMENTS

Figure 1:
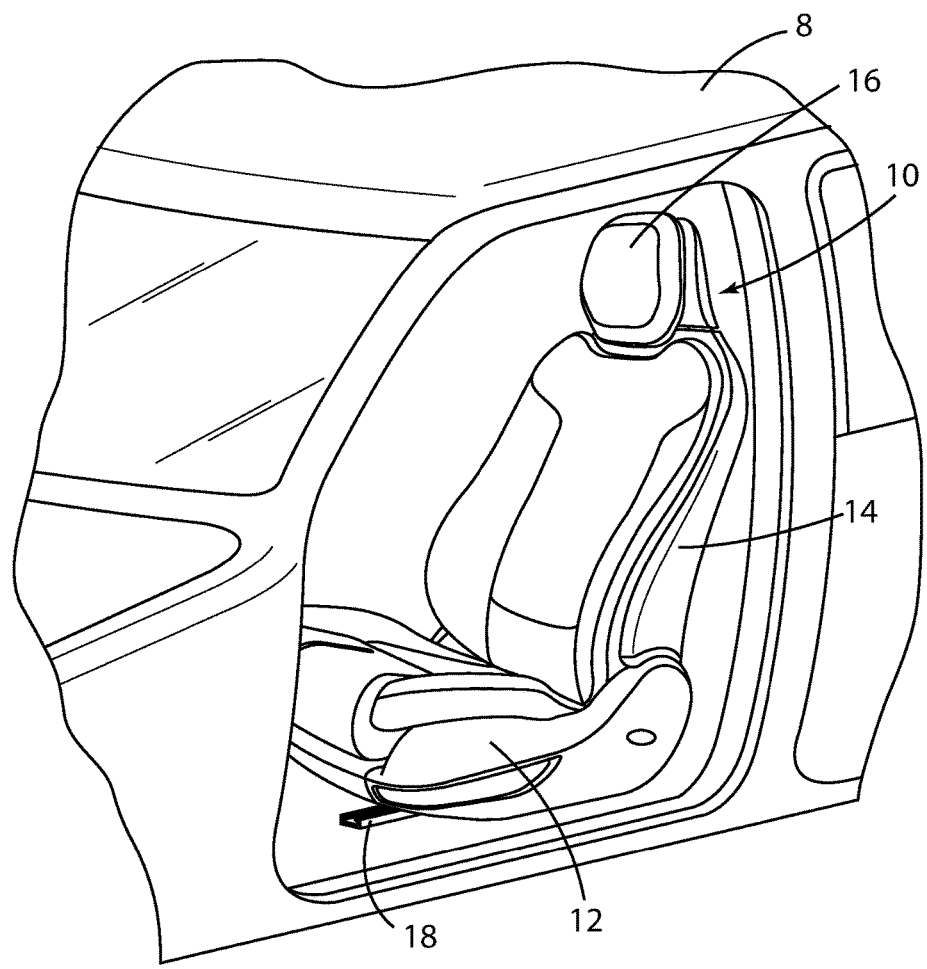
FIG. 1 is a front perspective view of motor vehicle provided with a first embodiment of a motor vehicle seating assembly of the present disclosure.
Figure 6:
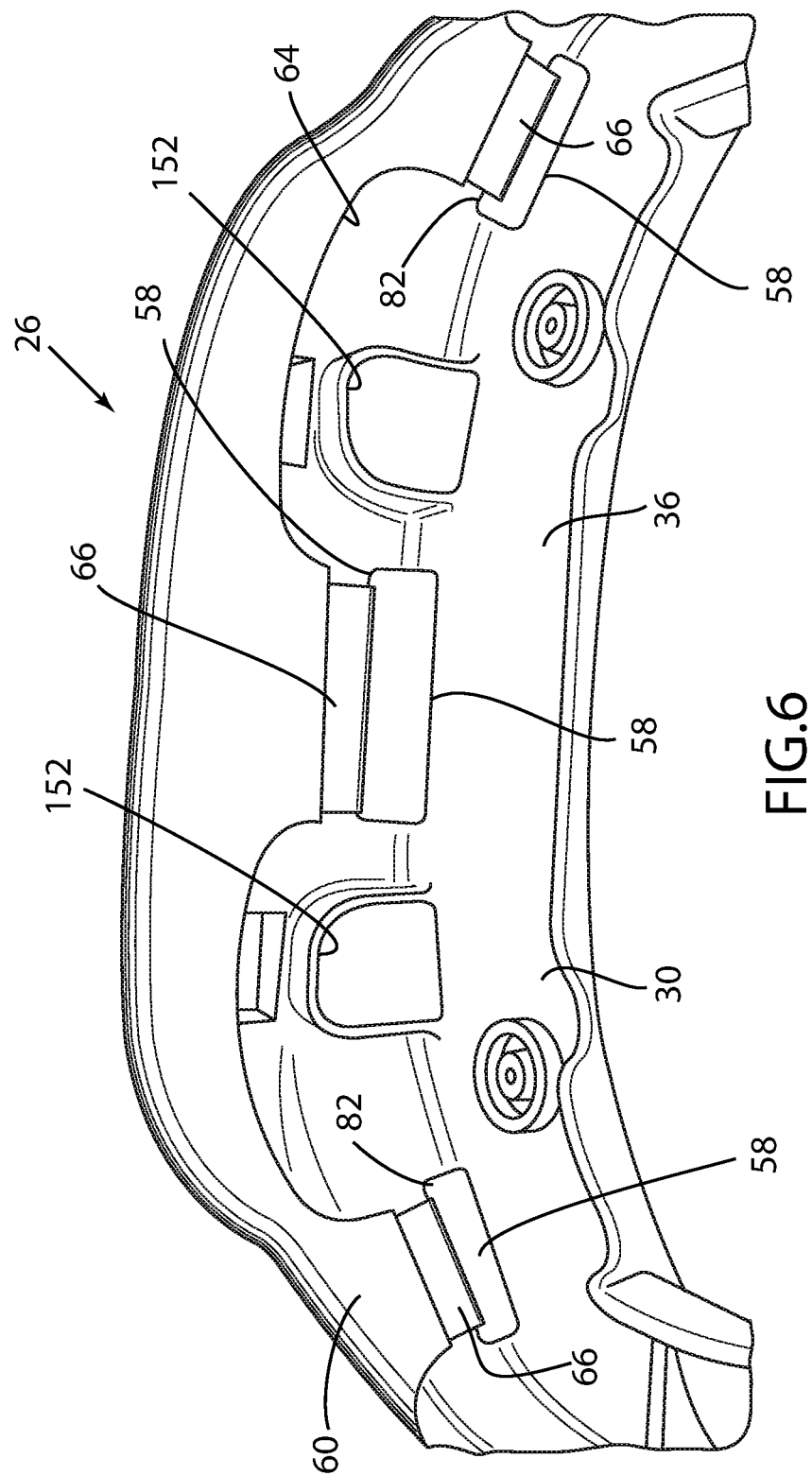
FIG. 6 is a rear perspective view of an upper portion of the seat back and suspension module of the motor vehicle seating assembly of FIG. 1 according to the present disclosure.
Figure 7:
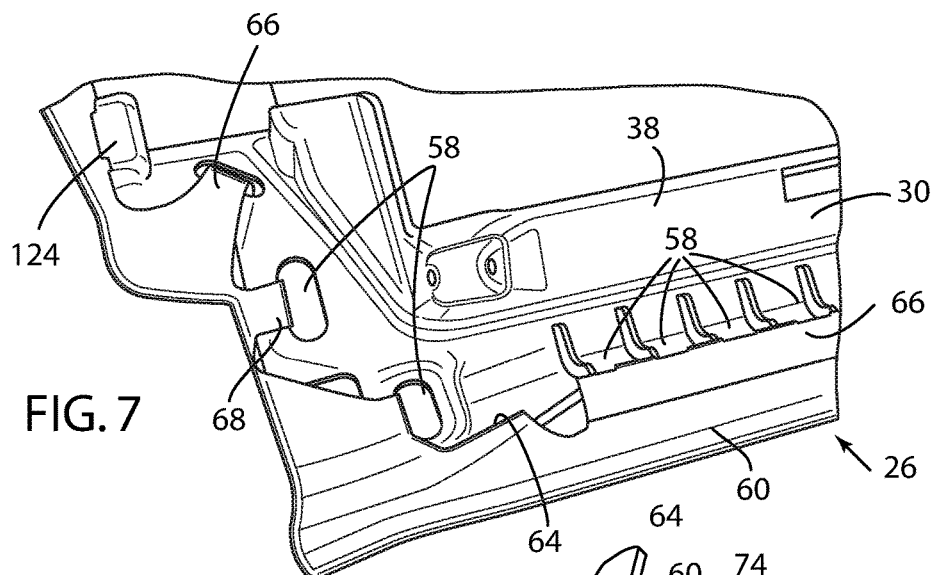
FIG. 7 is a rear perspective view of a lower portion of the seat back and suspension module of the motor vehicle seating assembly of FIG. 1 according to the present disclosure.

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Referring to FIGS. 1 and 2, reference numeral 10 generally designates a motor vehicle seating assembly for a motor vehicle 8 having a lower seat assembly 12 and an upwardly extending seat back assembly 14. The seat back assembly 14 preferably supports a head rest 16 thereon. The upwardly extending seat back assembly 14 is pivotally coupled with the lower seat assembly 12, such that the upwardly extending seat back assembly 14 can be moved between upright and inclined positions relative the lower seat assembly 12. The head rest 16 is operably, and preferably slidably, connected with the seat back assembly 14 and also positioned in a variety of positions and heights relative to the upwardly extending seat back assembly 14 to support the head and neck of a driver or a passenger.

Referring to FIG. 3, the lower seat assembly 12 includes a lower seat frame base 18 to which a lower seat cushion and suspension module 20 is attached. A decorative plastic fascia 22 is mounted to the lower seat assembly 12 and about the seat cushion and suspension module 20. The upwardly extending seat back assembly 14 includes a seat back frame 24, an upper seat back and suspension module 26, a decorative seat back rear panel module 28, and the head rest 16, as further discussed herein.

It is best shown in FIG. 4, the seat back and suspension module 26 includes a one-piece composite inner carrier substrate 30 and a suspension system 32 mounted to and supported by the one-piece composite inner carrier substrate 30. As shown in FIGS. 10-12, the one-piece composite inner carrier substrate 30 is preferably formed as an integrated and unitary structure via an injection molding process from a rigid plastic material containing reinforcing fibers, such as fiber glass fibers. The one-piece composite inner carrier substrate 30 is generally comprised of a pair of vertically extending side members 34, an upper transverse member 36, and a lower transverse member 38. A generally rectangular opening 40 is defined by the vertically extending side members 34, the upper transverse member 36, and the lower transverse member 38.

The result is an outer perimeter 42 extending about an outer edge 44 of the vertically extending side members, an outer edge 46 of the upper transverse member 36, and an outer edge 48 of the lower transverse member 38. Also, an inner perimeter 50 defining the generally rectangular opening 40 is created by an inner edge 52 of the vertically extending side members 34, an inner edge 54 of the upper transverse member 36, and an inner edge 56 of the lower transverse member 38. A plurality of attachment openings 58 is disposed about the outer perimeter 42 of the one-piece composite inner carrier substrate 30.

The one-piece composite inner carrier substrate 30 of the upper seat back and suspension module 26 forms a support structure to which a seat back trim cover 60 may be attached, as shown in FIGS. 6-9. The seat back trim cover 60 can be formed of any material typically applied to such applications, such as leather, vinyl, cloth, or any combination thereof. The seat back and suspension module 26 further comprises a cushion foam layer 62 concealed beneath and in juxtaposed relation with seat back trim cover 60. The seat back trim cover 60 has an outer perimeter 64 that is slightly larger than the outer perimeter 42 of the one-piece composite inner carrier substrate 30 of the seat back and suspension module 26, which allows the outer perimeter 64 of the seat back trim cover 60 to be folded over the outer perimeter 42 of the one-piece composite inner carrier substrate 30, as discussed further below.

Figure 8A:
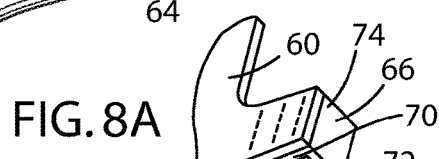
FIG. 8A is an enlarged perspective view of a seat back trim cover attachment fastener of the seat back and suspension module of the motor vehicle seating assembly of FIG. 1 according to the present disclosure.

A plurality of seat back trim cover attachment fasteners 66, each preferably comprising a J-retainer, are provided about the outer perimeter 64 of the seat back trim cover 60, as best shown in FIG. 8A. As a beneficial feature of the present disclosure, the J-retainer attachment fasteners 66 are located at strategic locations about the outer perimeter 64 of the seat back trim cover 60. The J-retainer attachment fasteners 66 are also preferably selected of a particular size from among a plurality of J-retainer attachment fastener 66 sizes that corresponds to the tension applied to the position about the outer perimeter 64 of the seat back trim cover 60. That is, when installed on the one-piece composite inner carrier substrate 30 as described herein, the seat back trim cover 60 experiences a different tension at different locations about its outer perimeter 64 when occupied by a seated occupant. In those locations that experience a higher tension, it is therefore advantageous that a larger J-retainer attachment fastener 66 be selected to provide a more robust attachment of the seat back trim cover 60 to the one-piece composite inner carrier substrate 30. The attachment openings 58 disposed about and proximate to the outer perimeter 42 of the one-piece composite inner carrier substrate 30 are preferably sized to receive the corresponding J-retainer attachment fastener 66 in the one-piece composite inner carrier substrate 30 at a particular location.

The J-retainer attachment fasteners 66, as are well known in the art, each comprise a plastic clip having a main portion 70 and a hook 72 provided at a distal end 74 of the main portion 70. The hook 72 preferably has a U-shaped configuration with an engaging portion 76 extending in parallel with the main portion 70. An inwardly extending gripping barb 78 is preferably provided at a distal end 80 of the engaging portion 76 that resiliently and detachably engages an edge 82 of the perimeter trim J-retainer attachment openings 58, as shown in FIG. 8A. Preferably, the plastic from which the J-retainer attachment fasteners 66 are constructed is a non-breakable material, such as polypropylene. The main portion 70 of the J-retainer attachment fasteners 66 is further preferably sewn directly to the outer perimeter 64 of the seat back trim cover 60, which when attached to a perimeter trim J-retainer attachment opening 58 about the outer perimeter 42 of the one-piece composite inner carrier substrate 30, keeps the seat back trim cover 60 tight against the one-piece composite inner carrier substrate 30.

During assembly of the seat back and suspension module 20, the seat back trim cover 60, with an exposed surface 84 facing forwardly relative the one-piece composite inner carrier substrate 30, is placed with the cushion foam layer 62 disposed beneath it against a forward surface 86 of the one-piece composite inner carrier substrate 30 and the suspension system 32 mounted to and supported by the one-piece composite inner carrier substrate 30. The outer perimeter 64 of the seat back trim cover 60, with the J-retainer attachment fasteners 66 installed at locations about its perimeter 64 corresponding to the discrete locations of the perimeter trim J-retainer attachment openings 58, is folded over the outer perimeter 42 of the one-piece composite inner carrier substrate 30. The J-retainer attachment fasteners 66 are then inserted into and received by the perimeter trim J-retainer attachment openings 58 to attach the seat back trim cover 60 at discrete points around the outer perimeter 42 of the one-piece composite inner carrier substrate 30 to maintain the seat back trim cover 60 in a taunt condition.

Figure 8:
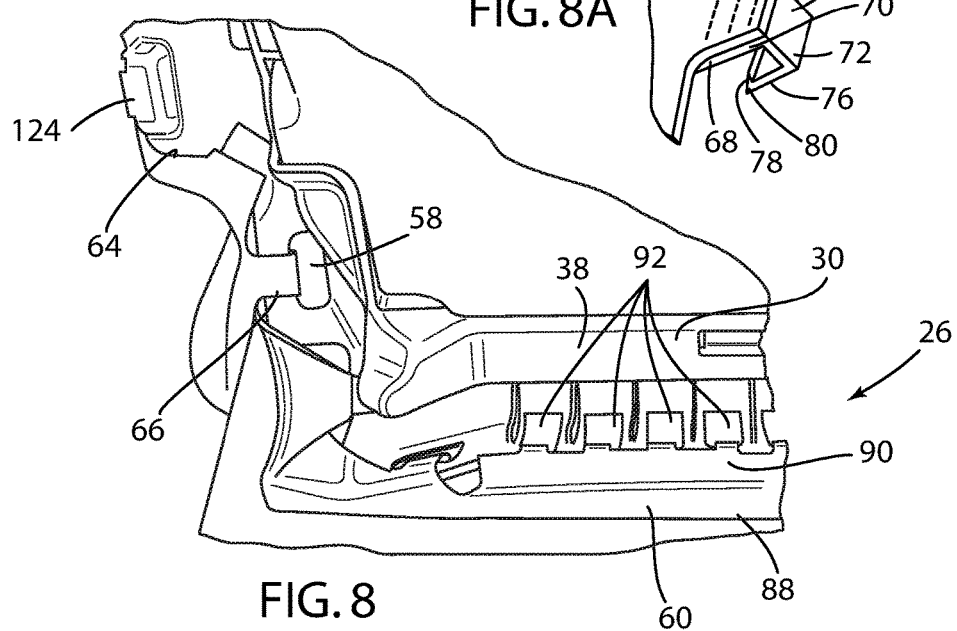
FIG. 8 is another rear perspective view of a lower portion of the seat back and suspension module of the motor vehicle seating assembly of FIG. 1 according to the present disclosure.
Figure 9:
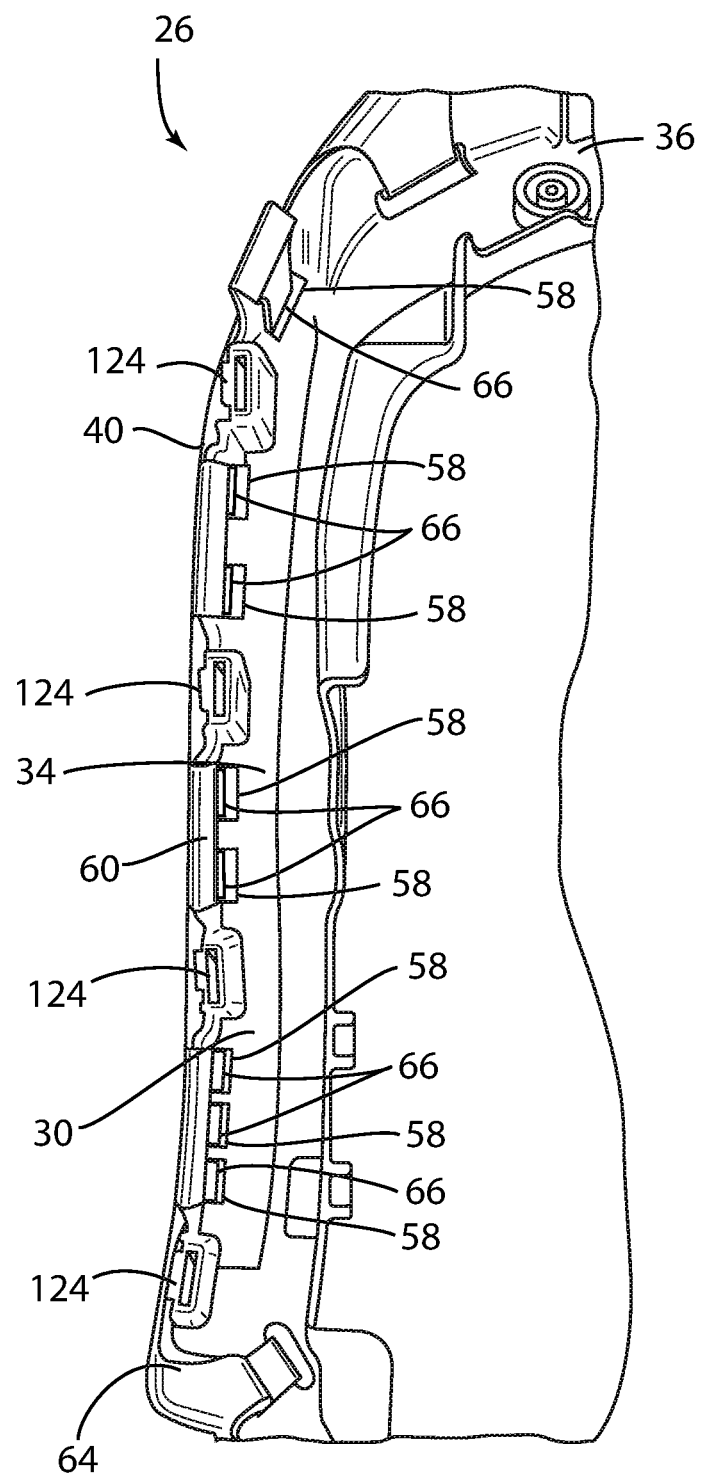
FIG. 9 is a rear perspective view of a side portion of the seat back and suspension module of the motor vehicle seating assembly of FIG. 1 according to the present disclosure.

As shown in FIGS. 6-12, preferably, each of the perimeter trim J-retainer attachment openings 58 disposed on the vertically extending side members 34 of the one-piece composite inner carrier substrate 30 have a plurality of opening widths that correspond to the size of the J-retainer attachment fastener 66 selected for and applied to that location about the outer perimeter 64 of the seat back trim cover 60. However, the width of the perimeter trim J-retainer attachment openings 58 can be sized to meet the need of the seat back trim cover 60 at any position about the outer perimeter 42 of the one-piece composite inner carrier substrate 30. A lower portion 88 of the seat back trim cover 60 is preferably attached to the lower transverse member 38 of the outer perimeter 42 of the one-piece composite inner carrier substrate 30 via a transversely extending integrated comb 90 of J-retainer attachment fasteners 66 received within a transversely extending and corresponding plurality of attachment openings 58 disposed along the lower transverse member 38 of the one-piece composite inner carrier substrate 30, as best shown in FIGS. 8 and 9.

As a result of the use of the J-retainer attachment fasteners 66 and perimeter trim J-retainer attachment openings 58 strategically disposed about the outer perimeter 42 of the one-piece composite inner carrier substrate 30, the seat back trim cover 60 can be easily and readily attached about the outer perimeter 42 of the one-piece composite inner carrier substrate 30. The perimeter trim J-retainer attachment openings 58 disposed about the outer perimeter 42 of the one-piece composite inner carrier substrate 30 thus allows for the seat back trim cover 60 to be attached at all critical points around the seat back and suspension module 26 from top to bottom to ensure that the seat back trim cover 60 remains taut and maintains a crafted appearance even as the occupant ingresses and egresses the motor vehicle seating assembly 10. Additionally, the perimeter trim J-retainer attachment openings 58 are purposely located to allow ease of attachment, low assembly efforts, and faster assembly times.

The decorative seat back rear panel module 28 represents a further innovation. In the past, most decorative back panels were typically constructed as a one-piece molded component, some of which were vinyl-wrapped. However, this approach tended to limit the ability to deliver unique styling and contrasting materials and surface finishes. In addition, a modular design and assembly concept offers reduced costs and can provide for the inclusion of additional components, such as airbag deployments, within the motor vehicle seating assembly 10.

Figure 14:
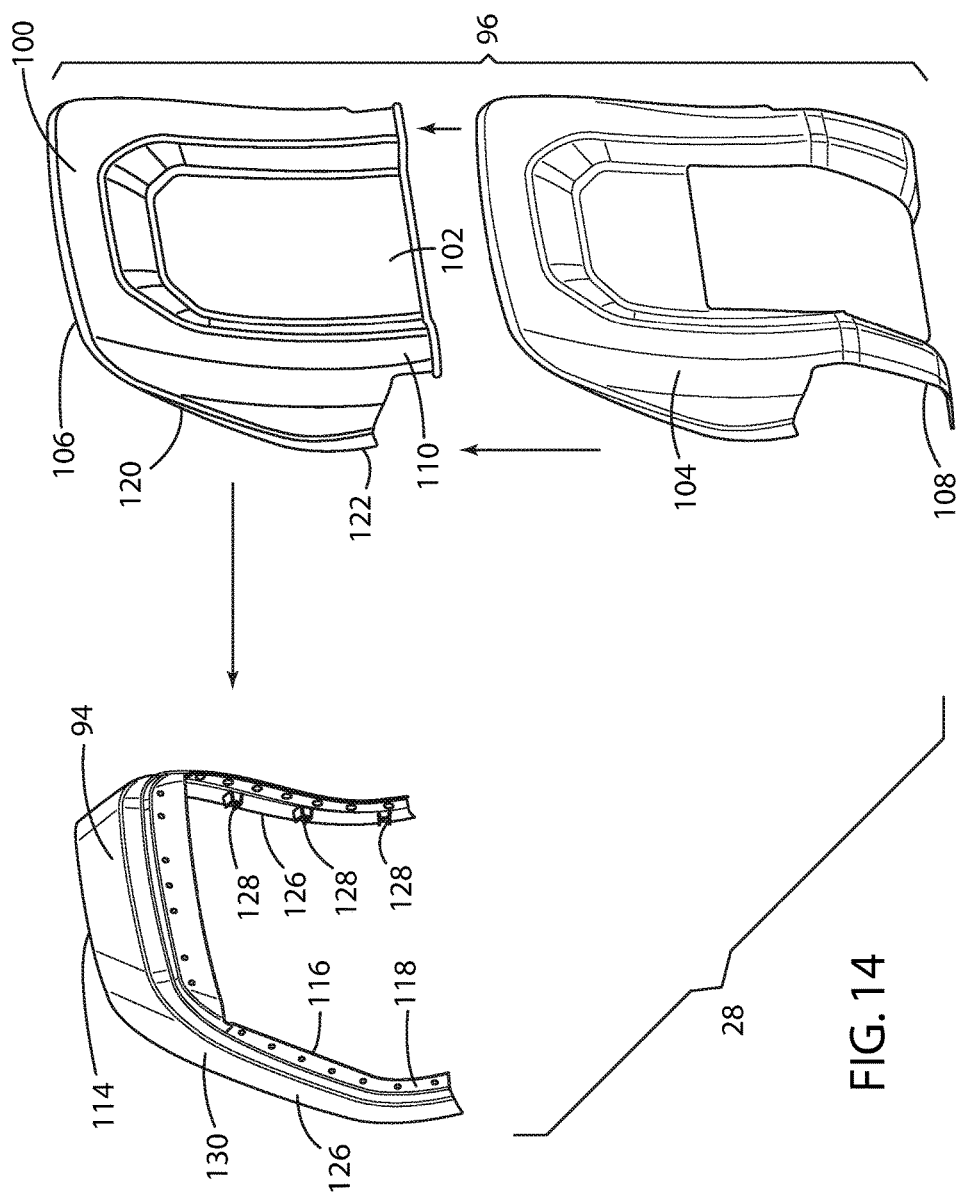
FIG. 14 is a rear perspective exploded view of the decorative seat back rear panel module of the motor vehicle seating assembly of FIG. 1 according to the present disclosure.
Figure 15:
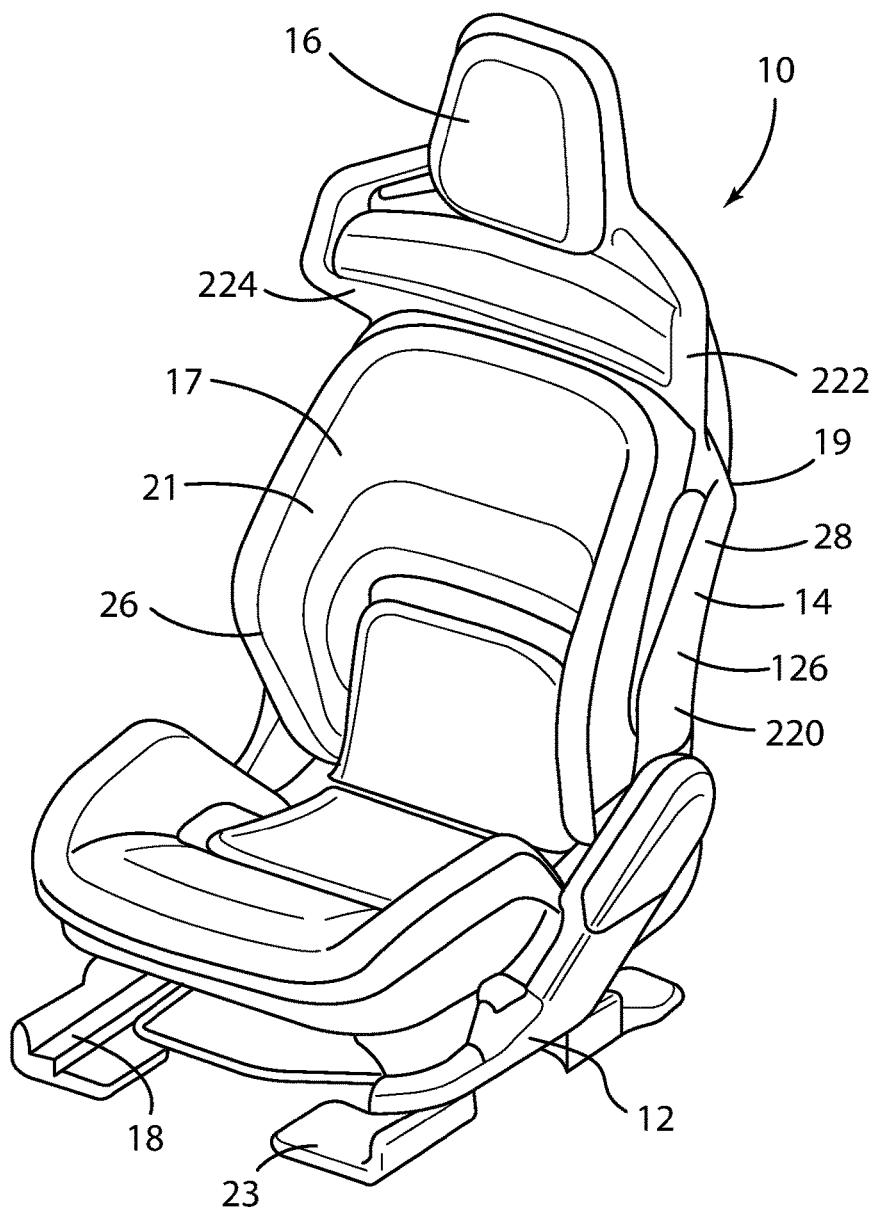
FIG. 15 is a front perspective view of a second embodiment of a motor vehicle seating assembly according to the present disclosure.

Accordingly, a first embodiment of the decorative seat back rear panel module 28 of the present disclosure comprises a first seat back rear perimeter panel 94 and a second seat back rear central panel 96 that is operably connected with the first seat back rear perimeter panel 94 and that together define a rear exterior surface area 98 of the decorative seat back rear panel module 28. The second seat back rear central panel 96 in turn comprises a molded substrate 100 having a rearward facing outer surface 102 and a trim covering 104 disposed against and attached to the outer surface 102 of the molded substrate 100. As best shown in FIGS. 13 and 14, the molded substrate 100 further comprises an outer perimeter 106, where the trim covering 104 is folded over the outer perimeter 106 of the molded substrate 100. Preferably, the trim covering 104 is attached to the molded substrate 100 at all areas of contact via a thin layer of adhesive to provide a smooth, wrinkle free, surface. Additionally, as noted above, the trim covering 104 can be fabricated from any of the usual materials used for trim coverings for motor vehicle seating assemblies, such as leather, vinyl, cloth, and combinations thereof. Preferably, the second seat back rear central panel 96 also receives a toe kick trim panel 108 depending from a lower portion 110 of the second seat back rear central panel 96.

The first seat back rear perimeter panel 94 is preferably injection molded from a semi-rigid plastic material. As a decorative component, the exposed rear exterior surface area 98 of the first seat back rear perimeter panel 94 represents an A-surface within the interior of the motor vehicle 8 and is preferably finished with a high grade, textured, grained surface to simulate leather or another predetermined surface finish.

As shown in FIG. 14, the first seat back rear perimeter panel 94 comprises a smaller portion of the rear exterior surface area 98 of the decorative seat back rear panel module 28 and the second seat back rear central panel 96 comprises a larger portion of the rear exterior surface area 98 of the decorative seat back rear panel module 28. Preferably, the first seat back rear perimeter panel 94 comprises about 30% of the rear exterior surface area 98 of the decorative seat back rear panel module 28 and the second seat back rear central panel 96 comprises a about 70% of the rear exterior surface area 98 of the decorative seat back rear panel module 28. This ratio between the portions of the rear exterior surface area 98 of the first seat back rear perimeter panel 94 relative the second seat back rear central panel 96 is believed to provide heretofore unattained flexibility in design and styling, in that interchangeable, second seat back rear central panel 96, each having different features and different coverings, can be readily interchanged to provide a wide range of differing motor vehicle seating assembly designs. For example, as shown in FIG. 13, the trim covering 104 for the second seat back rear central panel 96 may comprise a sewn cloth wrap having a sewn-in map pocket 112. Alternatively, beverage holders and closable compartments (not shown) might be incorporated within the second seat back rear central panel 96 and then merely attached to the first seat back rear perimeter panel 94 for subsequent assembly into the motor vehicle seating assembly 10 for a particular vehicle build, without having to adopt the same second seat back rear central panel 96 for every motor vehicle seating assembly 10 installed in a particular motor vehicle line.

For ease of assembly, the first seat back rear perimeter panel 94 has an outer perimeter 114 defining the outer perimeter of the decorative seat back rear panel module 28 and an inner perimeter 116 having a first mounting flange 118. The second seat back rear central panel 96 has a complementary outer perimeter 120 having a second mounting flange 122 overlapping with and attached to the first mounting flange 118 of the inner perimeter 116 of the first seat back rear perimeter panel 94. The second mounting flange 122 of the second seat back rear central panel 96 is preferably heat-staked to the first mounting flange 118 of the first seat back rear perimeter panel 94. Alternatively, the second mounting flange 122 of the second seat back rear central panel 96 may be vibration welded to the first mounting flange 118 of the first seat back rear perimeter panel 94.

With regard to assembly of the upwardly extending seat back assembly 14, as noted above, the one-piece composite inner carrier substrate 30 has a pair of vertically extending side members 34. The outer edge 44 of each of the vertically extending side members 34 of the one-piece composite inner carrier substrate 30 preferably includes a plurality of vertically aligned, molded-in attachment fasteners 124, as best shown in FIGS. 10-11. The first seat back rear perimeter panel 94 of the decorative seat back rear panel module 28, shown in FIG. 14, is likewise provided with a pair of vertically extending, forward facing, and opposed side edges 126 that each similarly include a plurality of complementary vertically aligned, molded-in attachment receptacles 128 that correspond to and are in alignment with the vertically aligned, molded-in attachment fasteners 124 of the one-piece composite inner carrier substrate 30. With the vertically aligned, molded-in attachment fasteners 124 of the one-piece composite inner carrier substrate 30 aligned and corresponding with the molded-in attachment receptacles 128 of the decorative seat back rear panel module 28, the molded-in attachment fasteners 124 of the one-piece composite inner carrier substrate 30 are resiliently secured by the molded-in attachment receptacles 128 of the decorative seat back rear panel module 28 when the seat back and suspension module 26 is assembled to the seat back frame 24. Preferably, the perimeter J-retainer attachment fasteners 66 disposed on the vertically extending side members 34 of the one-piece composite inner carrier substrate 30 alternate with the vertically aligned, molded-in attachment fasteners 124 disposed on the one-piece composite inner carrier substrate 30.

Additionally, the side edges 126 of the first seat back rear perimeter panel 94 of the decorative seat back rear panel module 28 are preferably configured to extend forwardly to form a trim panel 130 that abuts the resulting folded over perimeter 64 of the seat back trim cover 60 to form an aesthetically pleasing and finished appearance when attached with the one-piece composite inner carrier substrate 30.

Preferably, the one-piece composite inner carrier substrate supports the suspension system 32 within the generally rectangular opening 40 to resiliently support the weight of an occupant sitting in the motor vehicle seating assembly 10. The suspension system 32 generally comprises a first set of metal, preferably spring steel, wires 132 having a nominal wire thickness that extend transversely between a second set of metal wires 134 that extend vertically between the vertically extending side member 34, as best shown in FIGS. 11-12. A pair of transversely extending wires 136 operably connects the second set of metal wires 134 to each of the vertically extending side members 34 of the one-piece composite inner carrier substrate 30.

One of the pair of transversely extending wires 136 may be attached to each of the vertically extending side members 34 of the one-piece composite inner carrier substrate 30 via a load cell 138 mounted within a cavity 140 formed along the inner edge 52 of each of the vertically extending side members 34 of the one-piece composite inner carrier substrate 30, as shown in FIG. 11. The result is a suspension system 32 that has a spring web situated within the generally rectangular opening 40 and which provides resilient support against the weight of the occupant in a motor vehicle seating assembly 10. Further, in the event of a rear impact event, the inertia of an occupant seating in the motor vehicle seating assembly 10 pushes back against the upwardly extending seat back assembly 14 and creates tension in the suspension system 32. Optionally, the load cell 138 operably connected to the suspension system 32 may be situated to detect this event and transmit an appropriate signal to a motor vehicle controller (not shown).

Thus, an additional benefit of the one-piece composite inner carrier substrate 30 and decorative seat back rear panel module 28 of the present disclosure is that they may be readily provided with additional features or structures by changing the molds for the one-piece composite inner carrier substrate 30 or decorative seat back rear panel module 28. For example, one or more of the vertically extending side members 34 of the one-piece composite inner carrier substrate 30 can be modified and adapted to accept a housing or other mounting structure for a side airbag assembly mounted in the motor vehicle seating assembly 10 (not shown). Similarly, the pair of vertically extending, forward facing, and opposed side edges 126 of the first seat back rear perimeter panel 94 can be configured to include an integrated side airbag mounting chamber (see, e.g., FIG. 19).

A second embodiment of the decorative seat back rear panel module 28 of the present disclosure is configured to be adapted to an alternative seat design shown in FIGS. 15-21. The second embodiment is primarily directed toward a seating assembly particularly adapted to the performance customer niche. Elements and features similar to or common with the first embodiment are designated with the same character reference numbers.

As in the first embodiment, the vehicle seating assembly 10 includes a lower seat 12 and a seat back 14 pivotably attached to the lower seat assembly 12. The seat back 14 of the vehicle seating assembly 10 includes a forward facing surface 17 and a rearward facing surface 19. The forward facing surface 17 may be covered with a protective and/or decorative material 21. Leather and/or vinyl are often and preferably employed. The vehicle seating assembly 10 also includes a head rest 16 coupled to the seat back 14 of the vehicle seating assembly 10. The vehicle seating assembly 10 also typically includes a vehicle seat base 18 configured to provide structural support to the vehicle seating assembly 10. The vehicle seat base 18 is preferably supported on seat mounting rail assemblies 23, as is known in the art. The seat mounting rail assembly 23 is configured to allow the vehicle seating assembly 10 to be adjusted in forward and rearward directions relative to the longitudinal axis of the vehicle 6.

As shown in FIGS. 16-21, the seat back assembly 14 includes a seat back frame 24, an upper seat back and suspension module 26, and a decorative seat back rear panel module 28. The upper seat back and suspension module 26 and the decorative seat back rear panel module 28 enclose the seat back frame 24 in a clamshell type arrangement and form a lower seat back base portion. Preferably, as will be discussed more fully below, the seat back 14 includes a head rest hood module 222 that forms an upper portion 224 of the seat back 14. The head rest hood module 222 includes a front shell 226 and a rear shell 228, where the rear shell 228 is fixedly attached to the upwardly extending brace 230 of the seat back frame 24 through a pair of bosses 232 mounted on an inner surface 234 of the rear shell 228 of the head rest hood module 222 via a plurality of fasteners 236 extending through a plurality of orifices 238 provided on the upwardly extending brace 230.

Figure 16:
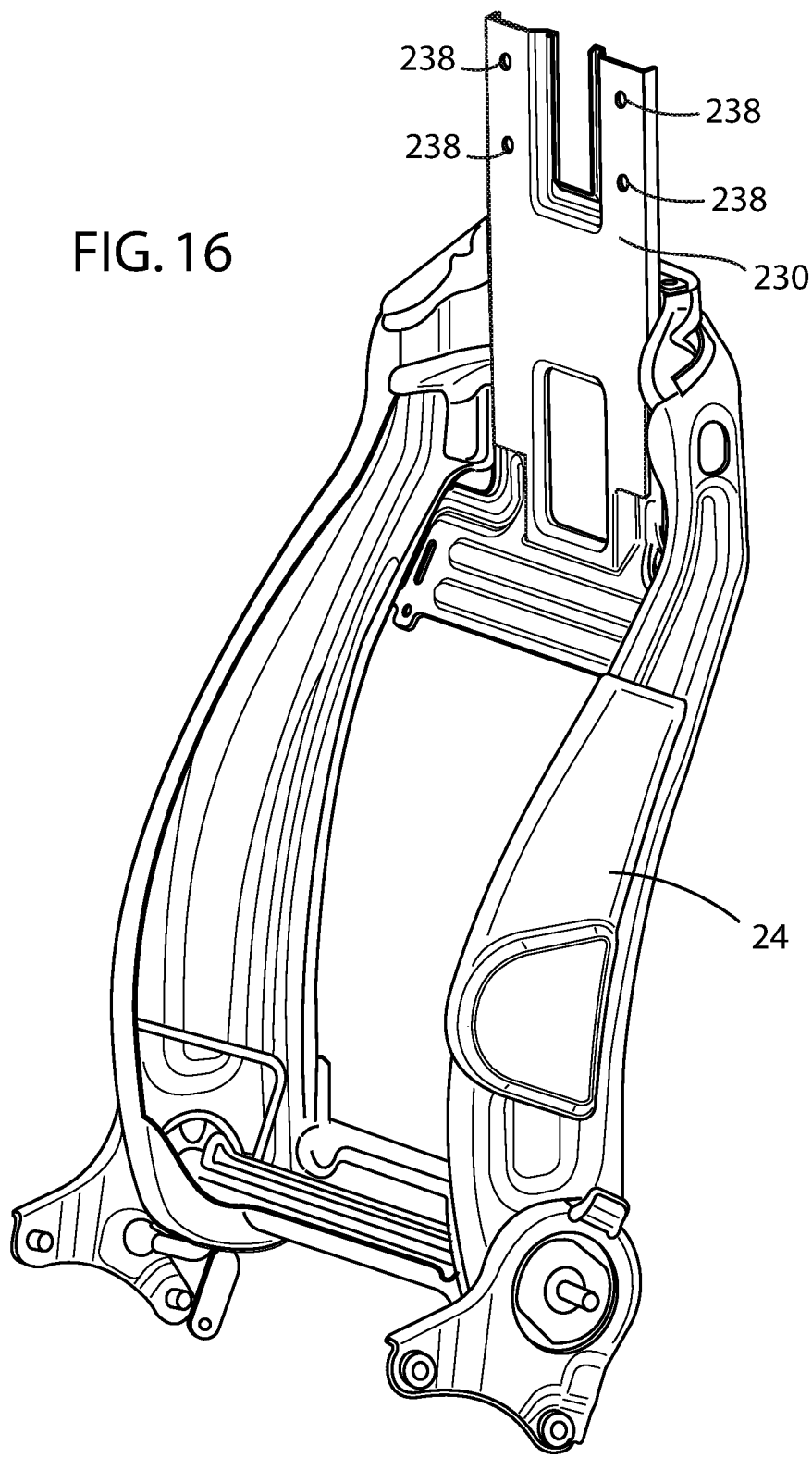
FIG. 16 is a front perspective view of the rear seat frame of the second embodiment of a motor vehicle seating assembly of FIG. 15 according to the present disclosure.
Figure 17:
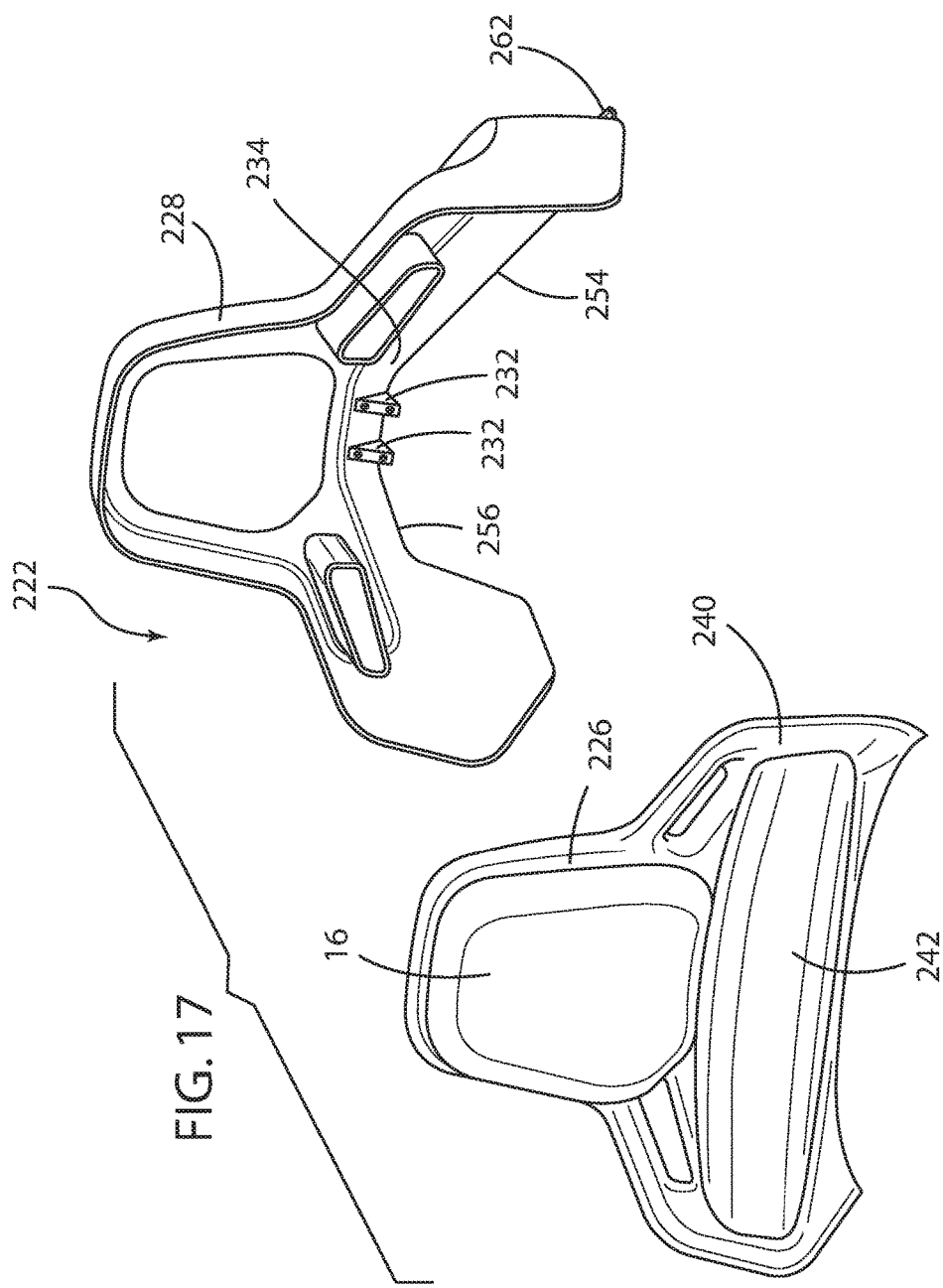
FIG. 17 is a front exploded perspective view of the head rest hood module of the second embodiment of a motor vehicle seating assembly of FIG. 15 according to the present disclosure.

The front shell 226 and rear shell 228 of the head rest hood module 222 enclose the upwardly extending brace 230 of the seat back frame 24 in a clamshell-type arrangement, as shown in FIGS. 16, 17, and 18. The outer and forward facing surface 240 of the front shell 226 of the head rest hood module 222 is preferably provided with the head rest 16, which is fabricated from a resilient foam material. Additionally, a shoulder pad assembly 242 is also provided on the outer and forward facing surface 240 extends across the lateral width of the head rest hood module 222.

As shown in FIGS. 16, 17, and 18, the lower seat back base portion 220 has a forward facing surface 244 and a rearward facing surface 246. The forward facing surface 244 comprises the seat back cushion module 26, while the rearward facing surface 246 comprises the decorative rear seat back rear panel module 28. The decorative seat back rear panel module 28 comprises a first seat back rear perimeter panel 94 and a second seat back rear central panel 96 that is operably connected with the first seat back rear perimeter panel 94, and that together define a rear exterior surface area 98 of the decorative seat back rear panel module 28. The second seat back rear central panel 96 preferably is fabricated from a molded substrate 100 having an outer surface 102 and a trim covering 104 disposed against the outer surface 102 of the molded substrate 100.

The first seat back rear perimeter panel 94 comprises an outer perimeter 114 defining an outer perimeter of the decorative seat back rear panel module 28 and an inner perimeter 116 having a first mounting flange 118. The second seat back rear central panel 96 comprises a complementary outer perimeter 120 having a second mounting flange 122 overlapping with and attached to the first mounting flange 118 of the inner perimeter 116 of the first seat back rear perimeter panel 94.

As in the first embodiment, the first seat back rear perimeter panel 94 comprises an injection molded component having a predetermined exterior surface finish. The first seat back rear perimeter panel 94 further comprises a pair of vertically extending, forward facing, and opposed side edges 126. In a preferred embodiment, one of the side edges 126 may advantageously include a concealed side-airbag mounting chamber 248. The first seat back rear perimeter panel 94 also includes an upper laterally transverse member 250 and a lower laterally transverse member 252, as further described herein.

According to the present disclosure, the rear shell 228 of the head rest hood module 222, attached to the upwardly extending brace 230 of the seat back frame 24, includes a mount 254 disposed proximate a lower rear edge 256 of the rear shell 228 of the head rest hood module 222. The upper laterally transverse member 250 of the first seat back rear perimeter panel 94 is likewise provided with an upper edge 258 that comprises a forward facing molded-in flange 260 extending along the upper edge 258 of the upper laterally transverse member 250 of the first seat back rear perimeter panel 94. The upper laterally transverse member 250 of the first seat back rear perimeter panel 94 is attached to the mount 254 disposed proximate the lower rear edge 256 of the rear shell 228 of the head rest hood module 222 via the forward facing molded-in flange 260 engaging the mount 254. The mount 254 may comprise any structure to which the forward facing molded in flange 260 may be secured, such as discrete bosses having a notch on an upper portion thereof into which the flange 260 is received, but preferably comprises a molded-in rearward facing flange 262 extending along a lower rear edge 256 of the rear shell 228 of the head rest hood module 222 that is adapted to receive and restrain the forward facing flange 260 of the upper laterally transverse member 250 of the first seat back rear perimeter panel 94.

The lower laterally transverse member 252 of the first seat back rear perimeter panel 94 is attached to the seat back frame 24 by fasteners 264. Preferably, a toe kick trim panel 108 is constructed from a plastic substrate to which a carpeted outer layers attached and depends from the lower laterally transverse member 252 of the first seat back rear perimeter panel 94. Preferably, the fasteners 264 used to attach the lower laterally transverse member 252 of the first seat back rear perimeter panel 94 to the seat back frame 24 can be also used to capture and restrain an upper edge 266 of the toe kick trim panel, as shown in FIGS. 20 and 21.

As shown in FIGS. 19-21, the rearward facing molded-in flange 262 along the lower rear edge 256 of the rear shell 228 of the head rest hood module 222 and the forward facing molded-in flange 260 along the upper edge 258 of the upper laterally transverse member 250 of the first seat back rear perimeter panel 94 extend across substantially a lateral width of the decorative seat back rear panel module 28. The rearward facing molded-in flange 262 preferably forms the lower rear edge 256 of the rear shell 228 of the head rest hood module 222.

A particularly advantageous feature of the instant disclosure is that the decorative seat back rear panel module 28 can be preferably fabricated from lightweight molded to shape materials with multiple integrated subassembly parts, such as the carpeted toe kick 108 cloth inserts, cloth inserts, and molded side edges 126 of varying configurations. In particular, the molded side edge 126 can be fabricated from a hard back material and adapted to enclose and conceal a side airbag until its deployment. The molded side edge 126 can further be modified to enable multiple stylings for the overall seat assembly appearance. In sum, the decorative seat back rear panel module 28 disclosed herein provides a lightweight, highly-styled and modular approach to configure an upwardly extending seat back assembly 14 in a cost competitive manner, with additional benefit of reduced mass for the performance customer niche.

Returning to the seating assembly 10 disclosed in the FIGS. 1 and 2, a further innovation of the present disclosure is the manner in which the one-piece composite inner carrier substrate 30 of the seat back and suspension module 20 is coupled to the seat back frame 24. In the past, assuring the structural integrity of the upper portion 142 of the vertically extending seat back assembly 14 has been an important design consideration. In accordance with the present disclosure, head rest guide sleeves 150 are employed as structural members to mechanically lock the one-piece composite inner carrier substrate 30 of the seat back and suspension module 26 to the seat back frame 24. The head rest guide sleeves 150 are pushed through aligned openings 152, 154 in each of the one-piece composite inner carrier substrate 30 and the seat back frame 24, respectively, during final seat assembly until fully seated and locked in place. Once installed, the head rest guide sleeves 150 operate in their usual manner and form guide sleeve cavities 156 within which the head rest mounting posts 158 of the head rest 16 can be vertically adjusted. This innovation contributes to the modular design disclosed herein, and provides an assembly concept that offers reduced costs and can provide improved design flexibility.

Figure 22:
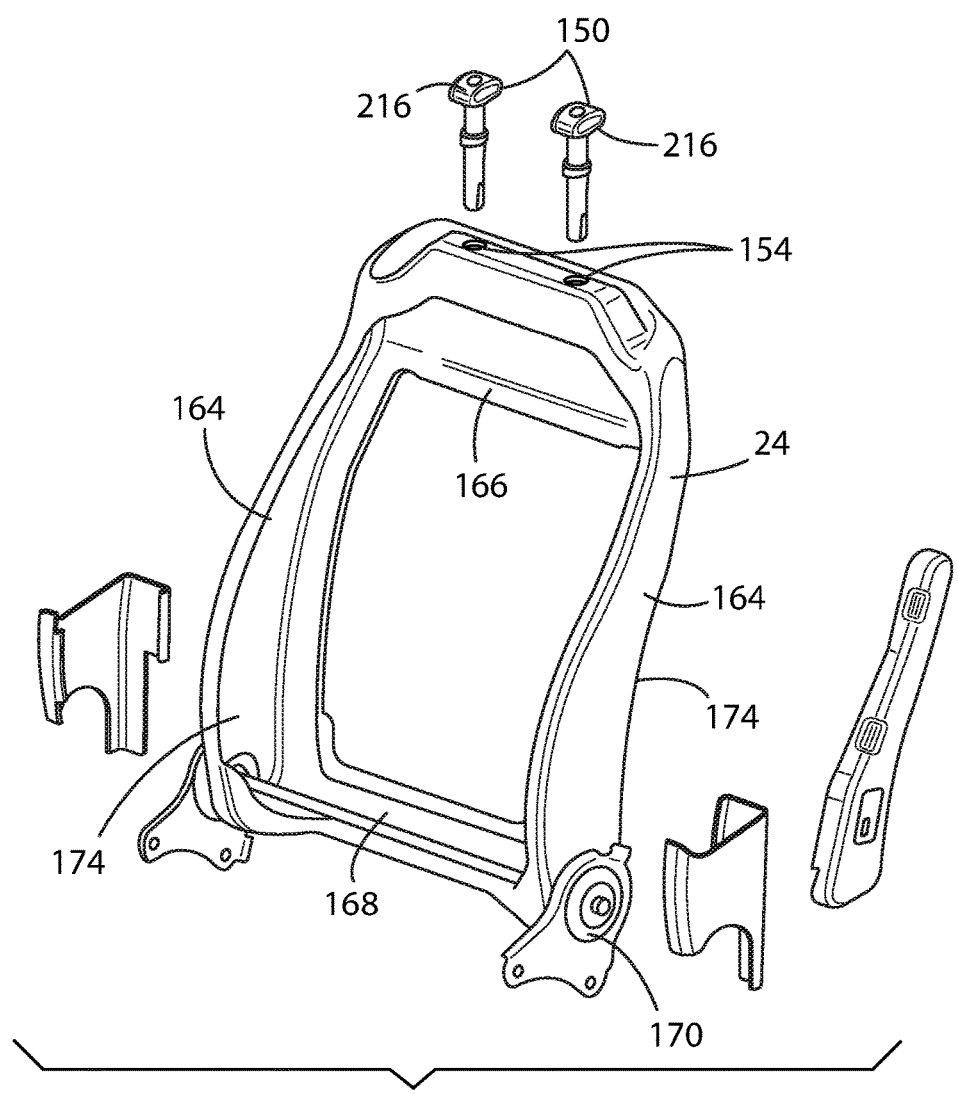
FIG. 22 is a front perspective view of the seat back frame of the motor vehicle seating assembly of FIG. 1 according to the present disclosure.

As shown in FIG. 3, the head rest 16 is rather conventional and consists of a head rest pad 160 and a pair of head rest mounting posts 158 depending from a lower surface 162 in the head rest pad 160. As shown in FIG. 22, the seat back frame 24 is the main structural member of the upwardly extending seat back assembly 14 and is comprised of a pair of vertically extending side members 164, an upper transverse member 166 forming an upper portion thereof, and a lower transverse member 168. An optional pivot assembly 170 rotationally couples the seat back frame 24 and the upwardly extending seat back assembly 14 to the lower seat base frame. The seat back frame 24 thus forms a forwardly facing surface 172 and a rearwardly facing surface 174 and is provided with a pair of vertically oriented frame openings 154 within the upper transverse member 166 forming the upper portion thereof. Similarly, the upper transverse member 36 of the one-piece composite inner carrier substrate 30 forming the upper portion of the seat back and suspension module 26 is provided with a pair of vertically oriented module openings 152 in the upper portion. The module openings 152 and frame openings 154 are disposed in vertical alignment, one with the other.

The pair of head rest guide sleeves 150 are vertically received and retained within the module openings 152 and frame openings 154, wherein the head rest mounting posts 158 are received and adjustably retained within the head rest guide sleeves 150, as shown in FIGS. 22-25. As further described below, the head rest guide sleeves 150 are received and retained within the module opening 152 and frame openings 154 of the upper transverse member 36 of the one-piece composite inner carrier substrate 30 and the upper transverse member 166 of the seat back frame 24, respectively, to mechanically lock the one-piece composite inner carrier substrate 30 to the seat back frame 24.

Vertically oriented openings 148 through each of an upper portion of the seat back trim cover 60 and an upper portion of the cushion foam layer 62 that overlay the upper portion 142 of the upwardly extending seat back assembly 14. Thus, the head rest guide sleeves 150 pass through the upper portion of the seat back and suspension module 26, which includes the upper portion of the seat back trim cover 60, the upper portion of the cushion foam layer 62, and the upper transverse member 36 of the upper portion of the one-piece composite inner carrier substrate 30, and into the upper transverse member 166 of the seat back frame, which receives and locks the head rest guide sleeve 150 in place subsequent assembly of the upwardly extending seat back assembly 14. As an injection molded component, the module openings 152 within the upper transverse member of the one-piece composite inner carrier substrate 30 are molded-in to receive the head rest guide sleeves 150 and lock the head rest guide sleeves 150 to the upper transverse member 36 of the one-piece composite inner carrier substrate 30 to the upper transverse member 166 of the seat back frame 24.

Figure 23:
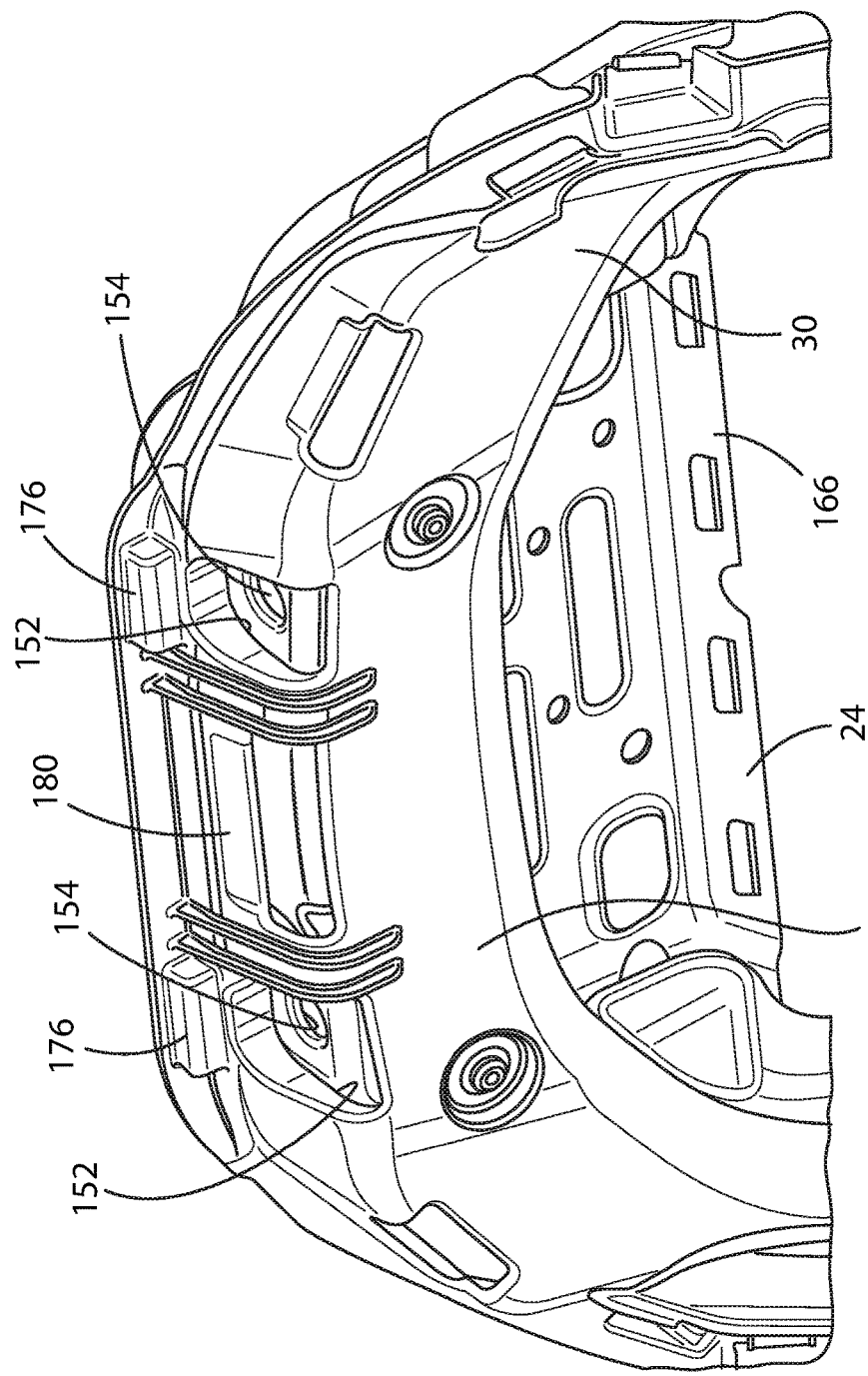
FIG. 23 is a front perspective view of the upper portion of the one-piece composite inner carrier substrate and the upper portion of the seat back frame of the motor vehicle seating assembly of FIG. 1 according to the present disclosure.
Figure 24:
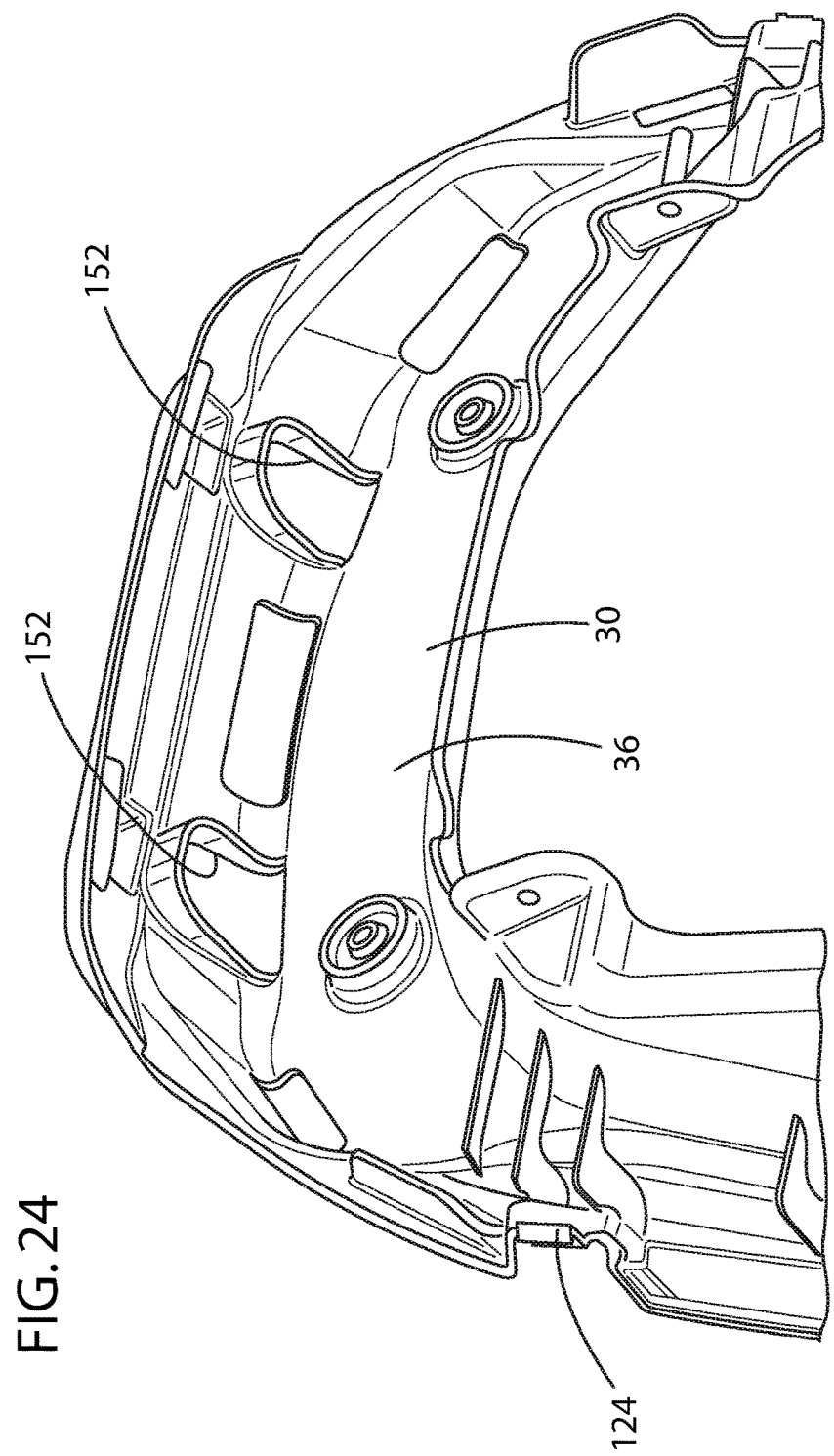
FIG. 24 is a rear perspective view of the upper portion of the one-piece composite inner carrier substrate of the motor vehicle seating assembly of FIG. 1 according to the present disclosure.

To this end, the upper transverse member 36 of the one-piece composite inner carrier substrate 30 also includes a pair of molded-in integral resilient locking pawls 176, preferably disposed at a peripheral position proximate a rear edge 178 of the molded-in module openings 152, as shown in FIG. 23. Each of the resilient locking pawls 176 is disposed adjacent to and extends toward each of the aligned module openings 152 in the one-piece composite inner carrier substrate 30. Each of the resilient locking pawls 176 also extends upwardly relative an upper surface 180 of the upper transverse member 36 of the one-piece composite inner carrier substrate 30 in a cantilevered fashion and are displaceable between a released position and an engaged position, as discussed further below. Further, each of the resilient locking pawls 176 has an inwardly inclined upper surface 182, a flat vertical face 184, and a lower edge 186. The forward and side edges 188, 190 of the molded-in module openings 152 do not necessarily need to be circular and can be oversized relative the frame openings 154 in the upper transverse member 166 of the seat back frame 24. Most important is that the downwardly extending head rest mounting posts 158 of the head rest 16 pass readily through the molded-in module openings 152 in the upper transverse member 36 of the one-piece composite inner carrier substrate 30. The head rest guide sleeves 150 are instead rigidly and fixedly retained in position via the frame openings 154 in the upper transverse member 166 of the seat back frame 24, as discussed below.

Figure 25:
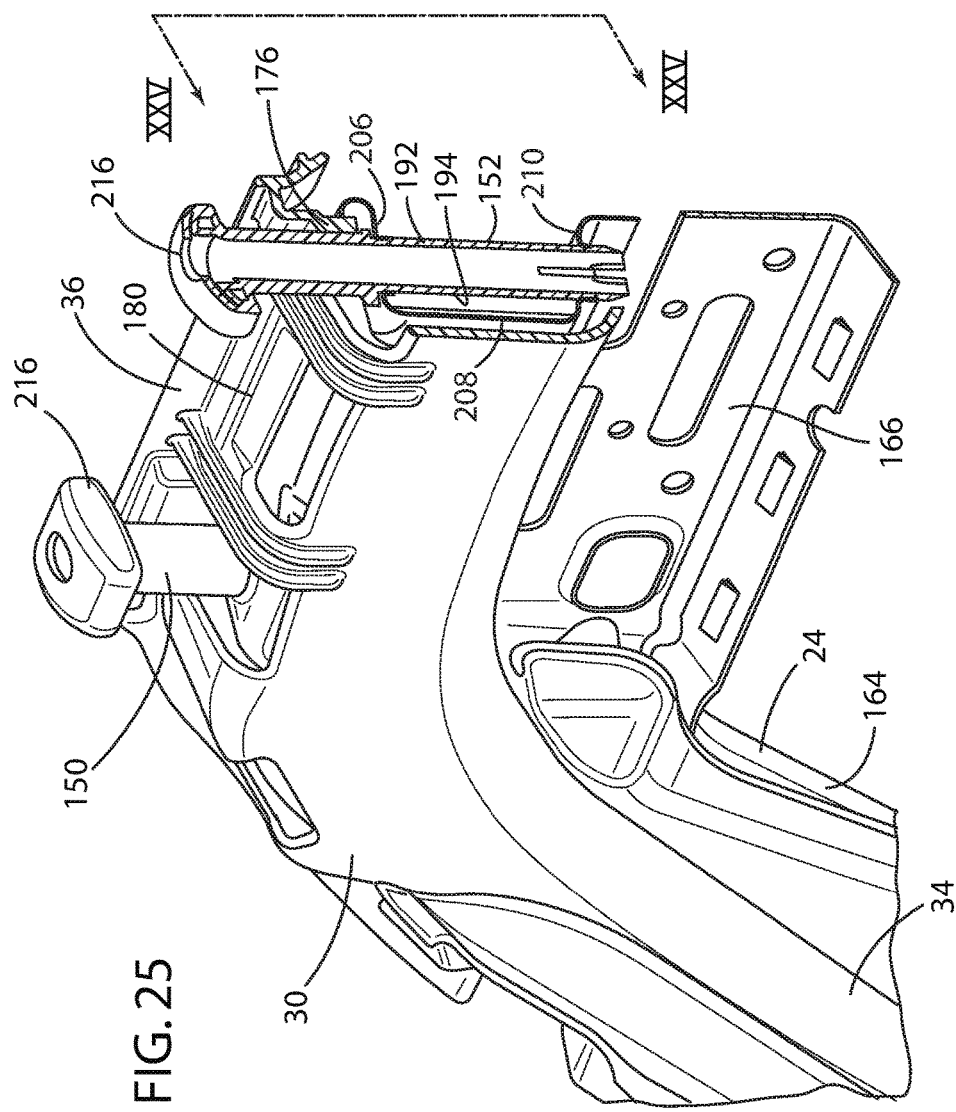
FIG. 25 is a perspective cross-sectional view of the upper portion of the one-piece composite inner carrier substrate and the upper portion of the seat back frame of the motor vehicle seating assembly of FIG. 1 according to the present disclosure.

As best shown in FIG. 25, the pair of head rest guide sleeves 150 each comprises a tubular member 192 having an outer cylindrical surface 194 and the guide sleeve cavity 156 within which the mounting posts 158 of the head rest 16 are received and restrained. The outer cylindrical surface 194 of each of the head rest guide sleeves 150 has a locking tab 196. The outer cylindrical surface 194 of the head rest guide sleeve 150 also include a stop 198 that engages the frame opening 154 of the upper transverse member 166 of the upper portion 142 of the seat back frame 24 when the head rest guide sleeve 150 is fully inserted.

As each of the head rest guide sleeves 150 is inserted after the assembled seat back, and suspension module 26 has been assembled with the decorative seat back rear panel module 28, as described above, the outer cylindrical surface 194 of the head rest guide sleeve 150 is received within an aligned opening 148 in the seat back trim cover 60 and the cushion foam layer 62, then module opening 152 of the upper transverse member 36 of the one-piece composite inner carrier substrate 30, and the frame openings 154 in the upper transverse member 166 of the seat back frame 24. As it is inserted, the locking tab 196 of the head rest guide sleeve 150 acts against the inwardly inclined upper surface 182 of the resilient locking pawl 176 and resiliently displaces the resilient locking pawl 176 away from the module opening 152 to the released position until the locking tab 196 moves downwardly relative to and clears the flat vertical face 184. With the head rest guide sleeve 150 fully inserted against the stop 198, the lower edge 186 of the resilient locking pawl 176 moves to the engaged position and mechanically engages an upper surface 200 of the locking tab 196 to prevent withdraw of the head rest guide sleeve 150 from the module opening 152 in the upper transverse member 36 of the one-piece composite inner carrier substrate 30. If it is desired to remove the head rest guide sleeve 150, an upper portion 202 of the resilient locking pawl 176 can be manually displaced to the released position, wherein the lower edge 186 of the resilient locking pawl 176 disengages the upper surface 200 of the locking tab 196 and the head rest guide sleeve 150 can be removed.

The two head rest guide sleeves 150, when pushed through the molded-in module openings 152 in the upper transverse member 36 of the one-piece composite inner carrier substrate 30 during the final seat assembly and fully seated, act as "mechanical locks" for the one-piece composite inner carrier substrate 30 to the seat back frame 24. The benefit of the "locks" helps prevent the one-piece composite inner carrier substrate 30 from listing forward during dynamic events and remain "locked" to the seat back frame 24 until manually released.

Figure 26:
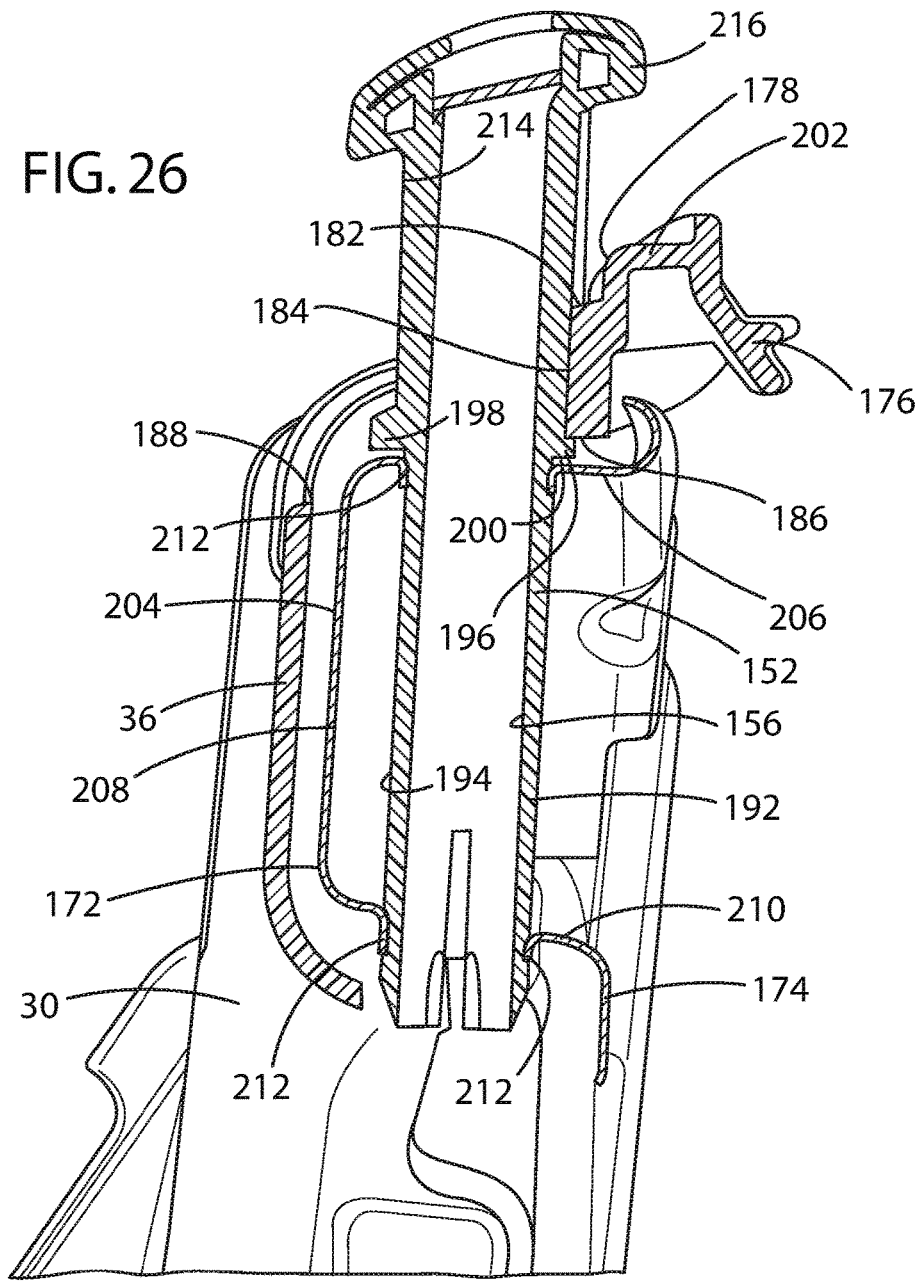
FIG. 26 is a side cross-sectional view taken along the line XXV-XXV in FIG. 25 of the upper portion of the one-piece composite inner carrier substrate and the upper portion of the seat back frame of the motor vehicle seating assembly of FIG. 1 according to the present disclosure.
Figure 27:
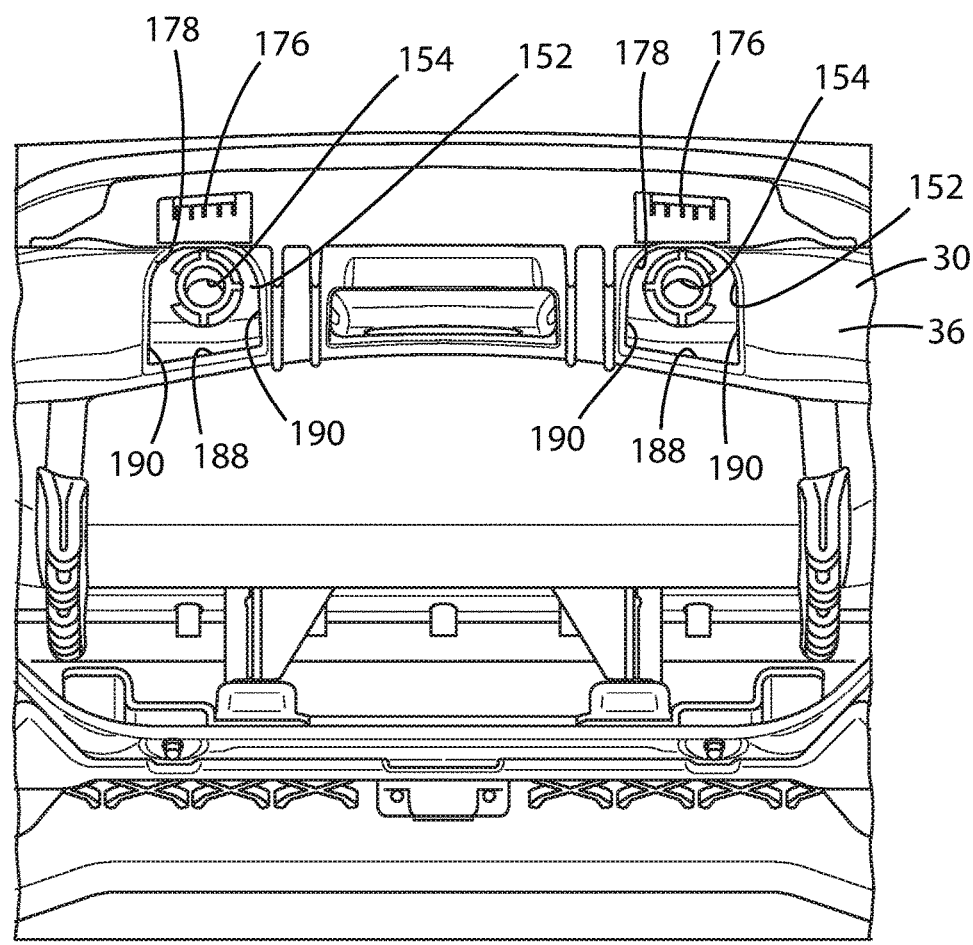
FIG. 27 is a perspective top view of the upper portion of the one-piece composite inner carrier substrate and the upper portion of the seat back frame of the motor vehicle seating assembly of FIG. 1 according to the present disclosure.

Preferably, the upper transverse member 36 of the seat back frame 24 comprises a U-shaped beam 204 having an upper horizontal flange 206, a vertical center portion 208, and a lower horizontal flange 210, which adds structural support to the seat back frame 24. Each of the upper horizontal flange 206 and lower horizontal flange 210 has vertically aligned frame openings 154 within which the outer cylindrical surface 194 of the head rest guide sleeve 150 is fittingly received. Preferably, each of these frame openings 154 has a downwardly curved and flared edge 212 to facilitate insertion of the head rest guide sleeve 150, as shown in FIG. 26. The upper and lower horizontal flanges 206, 210 also provide a mechanical attachment that creates a "line-to-line" contact to ensure that the head rest guide sleeves 150 do not tilt or move in a longitudinal or lateral direction when installed and provides a pass-through feature for the head rest guide sleeves 150.

Preferably, an upper portion 214 of the head rest guide sleeves 150 comprises a trim cover bezel 216, shown in FIGS. 22 and 26. As noted above, the outer cylindrical surface 194 of the head rest guide sleeve 150 also includes a stop 198 that engages the frame opening 154 on the upper horizontal flange 206 of the upper transverse member 166 of the seat back frame 24 when the head rest guide sleeve 150 is fully inserted. Preferably, the stop 198 is disposed opposite the locking tab 196 on the outer cylindrical surface 194 of the head rest guide sleeve 150 and below the trim cover bezel 216 by a distance corresponding to an overall thickness of the seat back trim cover 60 and cushion foam layer 62 disposed beneath the seat back trim cover 60 on the seat back and suspension module 26. Thus, when assembled, the trim cover bezel 216 conceals the openings 148 in the seat back trim cover 60 and provides an aesthetically presentable appearance.

As described above, the seat back and suspension module 26 and seat back frame 24 of the present disclosure provides integrated modular assembly features and supports JIT assembly practices by modularizing the seat back and suspension module 26 into a single module and therefore reduce the costs of final assembly by allowing this assembly to be sourced to a location independent of the traditional JIT assembly plant. The described seat back and suspension module 26 uses a one-piece composite inner carrier substrate 30 that enables the seat back trim cover 60 to be fully assembled and attached around the outer perimeter 42 of the one-piece composite inner carrier substrate 30 to provide a crafted, easier to assemble, and more cost- and time-efficient product for upwardly extending seat back assembly 14.

In order to modularize the upwardly extending seat back assembly 14 and to therefore reduce the costs of final assembly by requiring less trim assembly time and difficulty that accompanying seat trim "stuffing," as well as the option of allowing this assembly to be sourced to a location independent of the traditional JIT assembly plant, the disclosed one-piece composite inner carrier substrate 30 can be employed. Further, the cushion foam layer 62 disposed beneath the seat back trim cover 60 can reduced, resulting in the use of less material and a lighter weight for the upwardly extending seat back assembly 14. Also, the use of strategically located trim cover attachment openings 58 and J-retainer attachment fasteners 66 about virtually the entire outer perimeter 42 of the one-piece composite inner carrier substrate 30 and seat back trim cover 60 allows ease of attachment, low assembly efforts, and good retention for craftsmanship. The use of head rest guide sleeves 150 that are received and retained within module opening 152 and frame openings 154 of the upper transverse member 36 of the one-piece composite inner carrier substrate 30 and the upper transverse member 166 of the seat back frame 24, respectively, provide a ready and reliable mechanical lock between the one-piece composite inner carrier substrate 30 to the seat back frame 24. The one-piece composite inner carrier substrate 30 advantageously employs compounding technology to achieve a high strength composite structure, while integrating several benefits and features into a low cost and robust design and achieving a new look for styling.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A motor vehicle seating assembly for a motor vehicle having a lower seat assembly and an upwardly extending seat back assembly, the upwardly extending seat back assembly comprising;
   a seat back frame;
   a head rest hood module attached to an upper portion of the seat back frame, the head rest hood module comprising a mount disposed proximate a lower rear edge of the head rest hood module; and
   a decorative seat back rear panel module comprising a first seat back rear perimeter panel and a second seat back rear central panel operably coupled with the first seat back rear perimeter panel to define a rear exterior surface area of the decorative seat back rear panel module, wherein an upper laterally transverse member of the first seat back rear perimeter panel is attached to the mount disposed on the head rest hood module;
   wherein the upper laterally transverse member of the first seat back rear perimeter panel comprises a forward facing molded-in flange extending along an upper edge of the upper portion of the first seat back rear perimeter panel by which the upper laterally transverse member of the first seat back rear perimeter panel is attached to the mount disposed proximate the lower rear edge of the head rest hood module.

2. The motor vehicle seating assembly of claim 1, wherein the mount disposed proximate the lower rear edge of the head rest hood module comprises a rearward facing molded-in flange extending along a lower rear edge of the head rest hood module adapted to receive and restrain the forward facing molded-in flange of the upper laterally transverse member of the first seat back rear perimeter panel.

3. The motor vehicle seating assembly of claim 2, wherein the rearward facing molded-in flange extending along the lower rear edge of the head rest hood module and the forward facing molded-in flange extending along the upper edge of the upper laterally transverse member of the first seat back rear perimeter panel extend across substantially a lateral width of the decorative seat back rear panel module.

4. The motor vehicle seating assembly of claim 2, wherein the head rest hood module has a front shell portion and a rear shell portion and the rearward facing molded-in flange is disposed on the rear shell portion.

5. The motor vehicle seating assembly of claim 4, wherein the rearward facing molded-in flange comprises the lower rear edge of the head rest hood module.

6. The motor vehicle seating assembly claim 1, wherein a lower portion of the first seat back rear perimeter panel is attached to the seat back frame by fasteners.

7. The motor vehicle seating assembly of claim 1, wherein the second seat back rear central panel comprises a molded substrate having an outer surface and a trim covering disposed against the outer surface of the molded substrate.

8. The motor vehicle seating assembly of claim 1, wherein the upwardly extending seat back assembly further comprises a seat back cushion attached to the seat back frame.

9. The motor vehicle seating assembly of claim 1, wherein the first seat back rear perimeter panel comprises an injection molded component having a predetermined exterior surface finish.

10. The motor vehicle seating assembly of claim 1, wherein the first seat back rear perimeter panel comprises a pair of vertically extending, forward facing, and opposed side edges and wherein one of the side edges comprises a side-airbag mounting chamber.

11. The motor vehicle seating assembly of claim 1, wherein motor vehicle seating assembly further comprises a toe kick trim panel depending from a lower laterally transverse member of the first seat back rear perimeter panel.

12. The motor vehicle seating assembly of claim 1, wherein the first seat back rear perimeter panel comprises an outer perimeter defining an outer perimeter of the decorative seat back rear panel module and an inner perimeter having a first mounting flange, and the second seat back rear central panel comprises an outer perimeter having a second mounting flange overlapping with and attached to the first mounting flange of the inner perimeter of the first seat back rear perimeter panel.

13. The seat back assembly of claim 1, wherein a lower portion of the first seat back rear perimeter panel is attached to a lower portion of the seat back assembly by fasteners.

14. A motor vehicle seating assembly comprising a lower seat assembly and an upwardly extending seat back assembly, the upwardly extending seat back assembly comprising;
 a seat back frame;
 a head rest hood module attached to an upper portion of the seat back frame, the head rest hood module comprising a front shell portion, a rear shell portion, and a mount disposed proximate a lower rear edge of the rear shell portion of the head rest hood module; and
 a decorative seat back rear panel module comprising a first seat back rear perimeter panel and a second seat back rear central panel that define a rear exterior surface of the decorative seat back rear panel module, wherein the second seat back rear central panel comprises a molded substrate having an outer surface and a trim covering disposed against the outer surface of the molded substrate, and wherein an upper laterally transverse member of the first seat back rear perimeter panel comprises a forward facing molded-in flange along an upper edge of the upper laterally transverse member of the first seat back rear perimeter panel by which the upper laterally transverse member of the first seat back rear perimeter panel is attached to the mount disposed proximate the lower rear edge of the head rest hood module.

15. The motor vehicle seating assembly of claim 14, wherein the mount disposed proximate the lower rear edge of the shell portion of the head rest hood module comprises a rearward facing molded-in flange extending along the lower rear edge of the rear shell portion of the head rest hood module adapted to receive and restrain the forward facing molded-in flange of the upper laterally transverse member of the first seat back rear perimeter panel.

16. The motor vehicle seating assembly of claim 15, wherein the rearward facing molded-in flange extending along the lower rear edge of the rear shell portion of the head rest hood module and the forward facing molded-in flange extending along the upper edge of the upper laterally transverse member of the first seat back rear perimeter panel extend across substantially a lateral width of the decorative seat back rear panel module.

* * * * *